US012756868B2

(12) United States Patent
Yin et al.

(10) Patent No.: US 12,756,868 B2
(45) Date of Patent: Oct. 6, 2026

(54) FUSION MODE FOR ADAPTIVE LOOP FILTER IN VIDEO CODING

(71) Applicants: Beijing Bytedance Network Technology Co., Ltd., Beijing (CN); Bytedance Inc., Los Angeles, CA (US)

(72) Inventors: Wenbin Yin, Beijing (CN); Kai Zhang, San Diego, CA (US); Li Zhang, San Diego, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 18/430,867

(22) Filed: Feb. 2, 2024

(65) Prior Publication Data

US 2024/0179351 A1 May 30, 2024

Related U.S. Application Data

(63) Continuation of application No. PCT/CN2022/110805, filed on Aug. 8, 2022.

(30) Foreign Application Priority Data

Aug. 14, 2021 (WO) ................ PCT/CN2021/112639

(51) Int. Cl.
*H04N 19/80* (2014.01)
*H04N 19/157* (2014.01)

(52) U.S. Cl.
CPC ........... *H04N 19/80* (2014.11); *H04N 19/157* (2014.11)

(58) Field of Classification Search
CPC .... H04N 19/82; H04N 19/186; H04N 19/117; H04N 19/157
See application file for complete search history.

(56) References Cited

U.S. PATENT DOCUMENTS

| | | | | |
|---|---|---|---|---|
| 11,202,068 | B2 * | 12/2021 | Chen | H04N 19/117 |
| 11,838,554 | B2 * | 12/2023 | Deng | H04N 19/593 |
| 11,930,169 | B2 * | 3/2024 | Lai | H04N 19/186 |
| 12,177,426 | B2 * | 12/2024 | Taquet | H04N 19/117 |

(Continued)

FOREIGN PATENT DOCUMENTS

| | | | |
|---|---|---|---|
| CN | 109076218 | A | 12/2018 |
| CN | 112997500 | A | 6/2021 |

(Continued)

OTHER PUBLICATIONS

Cross component adaptive loop filter for chroma; Kiran; et al.—2019; (Year: 2019).*

(Continued)

*Primary Examiner* — Luis Perez-Fuentes
(74) *Attorney, Agent, or Firm* — Conley Rose, P.C.

(57) ABSTRACT

A method of processing media data. The method includes applying a fusion mode to an in-loop filtering method, a pre-processing method, or a post-processing method to filter a video unit in video coding; and performing a conversion between a video including the video unit and a bitstream of the video based on the fusion mode used. A corresponding video coding apparatus and non-transitory computer-readable recording medium are also disclosed.

19 Claims, 13 Drawing Sheets

(56) References Cited

U.S. PATENT DOCUMENTS

| | | | | |
|---|---|---|---|---|
| 12,388,989 | B2 * | 8/2025 | Deng | H04N 19/105 |
| 2014/0294068 | A1 * | 10/2014 | Andersson | H04N 19/176<br>375/240.02 |
| 2017/0332075 | A1 | 11/2017 | Karczewicz | |
| 2021/0084295 | A1 | 3/2021 | Chen | |
| 2022/0030232 | A1 | 1/2022 | Hu | |
| 2022/0116664 | A1 | 4/2022 | Ma | |
| 2022/0312006 | A1 | 9/2022 | Taquet | |
| 2023/0171403 | A1 | 6/2023 | Chiu | |
| 2024/0146916 | A1 | 5/2024 | Pan | |

FOREIGN PATENT DOCUMENTS

| | | | |
|---|---|---|---|
| CN | 113228646 | A | 8/2021 |
| WO | 2020126411 | A1 | 6/2020 |
| WO | 2020182620 | A1 | 9/2020 |
| WO | 2020211769 | A1 | 10/2020 |
| WO | 2020211809 | A1 | 10/2020 |
| WO | 2021021590 | A1 | 2/2021 |
| WO | 2021101345 | A1 | 5/2021 |

OTHER PUBLICATIONS

Sample adaptive offset in the HEVC standard; Fu; et al.—2012; (Year: 2012).*

Guided Image Filtering; He; et al.—2013; (Year: 2013).*

International Search Report and Written Opinion for International Application No. PCT/CN2022/110536, mailed Oct. 26, 2022, 13 Pages.

International Search Report and Written Opinion for International Application No. PCT/CN2022/110763, mailed Sep. 27, 2022, 9 Pages.

Lim S-C., et al., "Subsampled Sum-Modified-Laplacian for Adaptive Loop Filter in Versatile Video Coding," IEEE Access, Sep. 25, 2020, vol. 8, 13 Pages.

Tsai C-M., et al., "CE3.4.4: Additional LM-based Mode 5 for Intra Chroma Prediction," Joint Video Experts Team (JVET) of ITU-T SG 16 WP 3 and ISO/IEC JTC 1/SC 29/WG 11, 11th Meeting: Ljubljana, SI, Jul. 10-18, 2018, Document: JVET-K0241-v1, 6 Pages.

Strom, J., et al., "Bilateral Loop Filter in Combination with SAO," in proceeding of IEEE Picture Coding Symposium (PCS), Nov. 2019, 5 pages.

Document: JVET-B0060, Karczewicz, M., et al., "Improvements on adaptive loop filter," Joint Video Exploration Team (JVET) of ITU-T SG 16 WP 3 and ISO/IEC JTC 1/SC 29/WG 11 2nd Meeting: San Diego, USA, Feb. 20-26, 2016, 5 pages.

International Search Report from PCT Application No. PCT/CN2022/110805 dated Oct. 27, 2022, 9 pages.

Non-Final Office Action from U.S. Appl. No. 18/432,212 dated Oct. 28, 2025, 23 pages.

Non-Final Office Action from U.S. Appl. No. 18/430,882 dated Sep. 5, 2025, 24 pages.

Document: JVET-S2001-vH, Bross, B., et al., "Versatile Video Coding (Draft 10)," Joint Video Experts Team (JVET) of ITU-T SG 16 WP 3 and ISO/IEC JTC 1/SC 29/WG 11 19th Meeting: by teleconference, Jun. 22-Jul. 1, 2020, 548 pages. Relevant pp. 231-235, section 8.3.2.

Document: JVET-Software Manual, https://vcgit.hhi.fraunhofer.de/jvet-u-ee2/VVCSoftware_VTM/-/tree/VTM-11.2, Jan. 19, 2023, 62 pages.

* cited by examiner

200

Get text from
matter 00400

300

FUSION MODE FOR ADAPTIVE LOOP FILTER IN VIDEO CODING

CROSS-REFERENCE TO RELATED APPLICATIONS

This application is a continuation of International Patent Application No. PCT/CN2022/110805, filed on Aug. 8, 2022, which claims the benefit of International Application No. PCT/CN2021/112639 filed on Aug. 14, 2021. All of the aforementioned patent applications are hereby incorporated by reference in their entireties.

TECHNICAL FIELD

This present disclosure relates to video coding technologies.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed aspects/embodiments provide techniques where a fusion mode is applied to an in-loop filtering, a pre-processing method, or a post-processing filtering method to filter a video unit in video coding. In an embodiment, the in-loop filtering method comprises an adaptive loop filter (ALF), a cross component ALF, or any other filtering method. By applying the fusion mode, the video coding process is improved relative to conventional video coding techniques.

A first aspect relates to a method of processing video data. The method includes applying a fusion mode to an in-loop filtering method, a pre-processing method, or a post-processing method to filter a video unit in video coding; and performing a conversion between a video comprising the video unit and a bitstream of the video based on the fusion mode applied.

Optionally, in any of the preceding aspects, another implementation of the aspect provides that the fusion mode is used for the in-loop filtering method. Optionally, in any of the preceding aspects, another implementation of the aspect provides that the in-loop filtering method comprises an adaptive loop filter (ALF). Optionally, in any of the preceding aspects, another implementation of the aspect provides that the in-loop filtering method comprises a cross component adaptive loop filter (CCALF). Optionally, in any of the preceding aspects, another implementation of the aspect provides that the in-loop filtering method comprises a sample adaptive offset (SAO) filter, a deblocking (DB) filter, or a bilateral filter (BF).

Optionally, in any of the preceding aspects, another implementation of the aspect provides that the fusion mode is used for the pre-processing filtering method. Optionally, in any of the preceding aspects, another implementation of the aspect provides that the fusion mode is used for the post-processing filtering method.

Optionally, in any of the preceding aspects, another implementation of the aspect provides that an adaptive loop filter (ALF) processing unit within the video unit has one of plurality of different shapes or one of a plurality of different sizes.

Optionally, in any of the preceding aspects, another implementation of the aspect provides that the ALF processing unit is used to produce a classification result in an adaptive loop filter (ALF). Optionally, in any of the preceding aspects, another implementation of the aspect provides that a class index for the ALF processing unit is included in the bitstream, derived, pre-defined, or determined in real time, and wherein the ALF processing unit comprises a current ALF processing unit.

Optionally, in any of the preceding aspects, another implementation of the aspect provides that the ALF processing unit is used to produce a transpose index. Optionally, in any of the preceding aspects, another implementation of the aspect provides that the ALF processing unit uses different transpose functions for filters selected by the fusion mode, and wherein the different transpose functions are used to generate intermediate filtering results or final filtering results.

Optionally, in any of the preceding aspects, another implementation of the aspect provides that one of the transpose functions comprises a mirroring function. Optionally, in any of the preceding aspects, another implementation of the aspect provides that one of the transpose functions comprises a rotation function. Optionally, in any of the preceding aspects, another implementation of the aspect provides that one of the transpose functions comprises an affine function. Optionally, in any of the preceding aspects, another implementation of the aspect provides that one of the transpose functions comprises a transformation function. Optionally, in any of the preceding aspects, another implementation of the aspect provides that one of the transpose functions comprises a combination of a mirroring function and a rotation function. Optionally, in any of the preceding aspects, another implementation of the aspect provides that one of the transpose functions is a combination of a plurality of transpose functions. Optionally, in any of the preceding aspects, another implementation of the aspect provides that one of the transpose functions is indicated by one or more indices, and wherein the one or more indices are included in the video unit of the bitstream. Optionally, in any of the preceding aspects, another implementation of the aspect provides that one of the transpose functions is indicated by one or more indices, and wherein the one or more indices are included in the video unit of the bitstream.

Optionally, in any of the preceding aspects, another implementation of the aspect provides that the ALF processing unit is used to collect statistical information in an adaptive loop filter (ALF). Optionally, in any of the preceding aspects, another implementation of the aspect provides that samples within the ALF processing unit are used to generate filter coefficients based on a classification result or a clipping result. Optionally, in any of the preceding aspects, another implementation of the aspect provides that samples within the ALF processing unit are used to generate a transpose index or to select a transpose function. Optionally, in any of the preceding aspects, another implementation of the aspect provides that the ALF processing unit is used to select a specific filter within an adaptation parameter set (APS) or a pre-defined filter set in accordance with a classification result.

Optionally, in any of the preceding aspects, another implementation of the aspect provides that a filter index within the APS or the pre-defined filter is assigned to an adaptive loop filter (ALF) processing unit. Optionally, in any of the preceding aspects, another implementation of the aspect provides that the filter index is included in the bitstream, derived, pre-defined, or determined in real time. Optionally, in any of the preceding aspects, another implementation of the aspect provides that samples within the ALF processing unit use an identical filter for filtering.

Optionally, in any of the preceding aspects, another implementation of the aspect provides that a shape of the ALF processing unit is square. Optionally, in any of the preceding aspects, another implementation of the aspect provides that a shape of the ALF processing unit is diamond. Optionally, in any of the preceding aspects, another implementation of the aspect provides that a shape of the ALF processing unit is a rectangle. Optionally, in any of the preceding aspects, another implementation of the aspect provides that a shape of the ALF processing unit is symmetrical. Optionally, in any of the preceding aspects, another implementation of the aspect provides that a shape of the ALF processing unit is asymmetrical. Optionally, in any of the preceding aspects, another implementation of the aspect provides that a shape of the ALF processing unit is a designed shape.

Optionally, in any of the preceding aspects, another implementation of the aspect provides that the ALF processing unit has a size of M×N, where M represents a first dimension of the ALF processing unit and N represents a second dimension of the ALF processing unit.

Optionally, in any of the preceding aspects, another implementation of the aspect provides that M is equal to N. Optionally, in any of the preceding aspects, another implementation of the aspect provides that M is different than N. Optionally, in any of the preceding aspects, another implementation of the aspect provides that either M or N has a value of one. Optionally, in any of the preceding aspects, another implementation of the aspect provides that each of M and N have a value of one simultaneously.

Optionally, in any of the preceding aspects, another implementation of the aspect provides that the ALF processing unit is one of a plurality of ALF processing units.

Optionally, in any of the preceding aspects, another implementation of the aspect provides that the video unit comprises a coding unit (CU).

Optionally, in any of the preceding aspects, another implementation of the aspect provides that the video unit comprises a coding tree unit (CTU).

Optionally, in any of the preceding aspects, another implementation of the aspect provides that the video unit comprises a coding tree unit (CTU) row.

Optionally, in any of the preceding aspects, another implementation of the aspect provides that the video unit comprises a region that contains more than one luma sample or pixel or contains more than one chroma sample or pixel.

Optionally, in any of the preceding aspects, another implementation of the aspect provides that a plurality of filters are configured to filter the video unit in the fusion mode to produce a final filtering result of the video unit, wherein the video unit comprises a sample in an adaptive loop filter (ALF) processing unit, and wherein the fusion mode is referred to as an ALF fusion mode.

Optionally, in any of the preceding aspects, another implementation of the aspect provides that one or more virtual filters are generated based on the plurality of filters, and wherein the plurality of filters are included in the bitstream or derived based on information in the bitstream.

Optionally, in any of the preceding aspects, another implementation of the aspect provides that one or more virtual filters are generated by a function of filter coefficients associated with the plurality of filters, and wherein the plurality of filters are included in the bitstream or derived based on information in the bitstream. Optionally, in any of the preceding aspects, another implementation of the aspect provides that the function is a linear weighted sum. Optionally, in any of the preceding aspects, another implementation of the aspect provides that the function is a non-linear function.

Optionally, in any of the preceding aspects, another implementation of the aspect provides that a plurality of temporary filtering results are generated based on the plurality of filters, wherein the plurality of filters are included in the bitstream or derived based on information in the bitstream, and wherein the plurality of temporary filtering results are used to produce the final filtering result of the video unit.

Optionally, in any of the preceding aspects, another implementation of the aspect provides that a plurality of temporary filtering results are generated based on the plurality of filters, and wherein the final filtering result of the video unit is generated by a function of the plurality of temporary filtering results. Optionally, in any of the preceding aspects, another implementation of the aspect provides that the function is a linear weighted sum. Optionally, in any of the preceding aspects, another implementation of the aspect provides that the function is a non-linear function.

Optionally, in any of the preceding aspects, another implementation of the aspect provides that the plurality of filters are included in different adaptive loop filter (ALF) adaptation parameter sets (APSs) in the bitstream or derived based on information in the different ALF APSs in the bitstream.

Optionally, in any of the preceding aspects, another implementation of the aspect provides that the plurality of filters are obtained from pre-defined filter sets.

Optionally, in any of the preceding aspects, another implementation of the aspect provides that all samples in the ALF processing unit share a same fusion process corresponding to the fusion mode. Optionally, in any of the preceding aspects, another implementation of the aspect provides that all samples in the video unit share a same fusion process corresponding to the fusion mode.

Optionally, in any of the preceding aspects, another implementation of the aspect provides that indications of function parameters corresponding to the fusion mode are included in the bitstream, and wherein the function parameters comprise weights used in filtering.

Optionally, in any of the preceding aspects, another implementation of the aspect provides that the indications are included in a picture header (PH), a slice header, a coding tree unit (CTU), a coding tree block (CTB), or a region level.

Optionally, in any of the preceding aspects, another implementation of the aspect provides that the indications are derived in real time.

Optionally, in any of the preceding aspects, another implementation of the aspect provides that the fusion mode is used independently for the video unit.

Optionally, in any of the preceding aspects, another implementation of the aspect provides that two or more different fusion modes are used jointly for the video unit.

Optionally, in any of the preceding aspects, another implementation of the aspect provides that two or more different fusion modes are used for different color components or different color spaces independently.

Optionally, in any of the preceding aspects, another implementation of the aspect provides that two or more different fusion modes are used for different color components or different color spaces jointly.

Optionally, in any of the preceding aspects, another implementation of the aspect provides that the video unit comprises a sequence of pictures, a picture, a sub-picture, a slice, a tile, one or more coding tree units (CTUs), a CTU row, a coding unit (CU), a prediction unit (PU), a transform unit (TU), a coding tree block (CTB), a coding block (CB), a prediction block (PB), a transform block (TB), any region that contains more than one luma sample or pixel, or any region that contains more than one chroma sample or pixel.

Optionally, in any of the preceding aspects, another implementation of the aspect provides that whether or how to apply the method is indicated in the bitstream at a sequence level, group of pictures level, picture level, slice level, tile group level or in a sequence header, picture header, sequence parameter set (SPS), video parameter set (VPS), dependency parameter set (DPS), decoder capability information (DCI), picture parameter set (PPS), adaptation parameter set (APS), slice header, or tile group header.

Optionally, in any of the preceding aspects, another implementation of the aspect provides that whether or how to apply the method is indicated in a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or region that contains more than one sample or pixel.

Optionally, in any of the preceding aspects, another implementation of the aspect provides that whether or how to apply the method is dependent on coded information, and wherein the coded information comprises a block size, a color format, a single or dual tree partitioning, a color component, a slice type, or a picture type.

Optionally, in any of the preceding aspects, another implementation of the aspect provides that the conversion includes encoding the video data into the bitstream. Optionally, in any of the preceding aspects, another implementation of the aspect provides that the conversion includes decoding the video data from the bitstream.

A second aspect relates to a method of processing video data, comprising: determining that a non-linear filtering operation is applied for a video unit; generating at least one first filtering index for the video unit; deriving a first filtering coefficient set based on the at least one first filtering index; and performing the non-linear filtering operation based on the first filtering coefficient set.

Optionally, in any of the preceding aspects, another implementation of the aspect provides that a first clipping parameter set is derived based on the at least one first filtering index and at least one filtering clipping syntax element, and wherein the non-linear filtering operation is further based on the first clipping parameter set.

A third aspect relates to an apparatus for processing video data comprising a processor and a non-transitory memory with instructions thereon, wherein the instructions upon execution by the processor, cause the processor to execute any of the disclosed methods.

A fourth aspect relates to a non-transitory computer-readable recording medium storing a bitstream of a video which is generated by any of the disclosed methods performed by a video processing apparatus.

A fifth aspect relates to a non-transitory computer-readable storage medium storing instructions that cause a processor to execute any of the disclosed methods.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
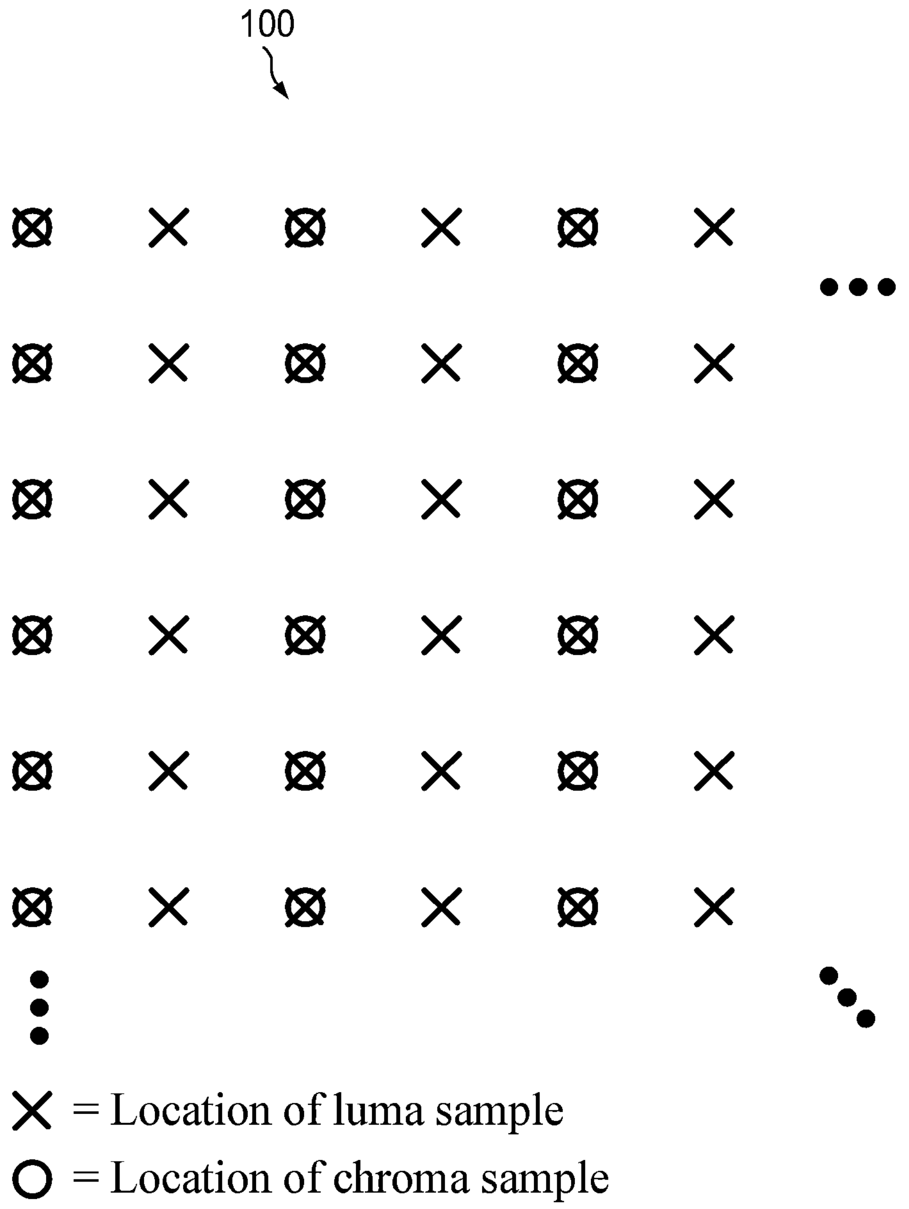
FIG. 1 is an example of a nominal vertical and horizontal locations of 4:2:2 luma and chroma samples in a picture.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

H.266 terminology is used in some description only for case of understanding and not for limiting scope of the disclosed techniques. As such, the techniques described herein are applicable to other video codec protocols and designs also.

The present disclosure is related to video coding technologies. Specifically, the present disclosure is related to in-loop filter and other coding tools in image/video coding. The ideas may be applied individually, or in various combinations, to any existing video coding standard or non-standard video codec like High Efficiency Video Coding (HEVC) and Versatile Video Coding (VVC). The proposed ideas may be also applicable to future video coding standards or video codecs.

Video coding standards have evolved primarily through the development of the well-known International Telecommunication Union-Telecommunication (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/High Efficiency Video Coding (HEVC) standards.

Since H.262, the video coding standards are based on the hybrid video coding structure wherein temporal prediction plus transform coding are utilized. To explore the future video coding technologies beyond HEVC, Joint Video Exploration Team (JVET) was founded by Video Coding Experts Group (VCEG) and MPEG jointly in 2015. Since then, many new methods have been adopted by JVET and put into the reference software named Joint Exploration Model (JEM).

In April 2018, the Joint Video Expert Team (JVET) between VCEG (Q6/16) and ISO/IEC JTC1 SC29/WG11 (MPEG) was created to work on the Versatile Video Coding (VVC) standard targeting at fifty percent (50%) bitrate reduction compared to HEVC. The first version of the VVC test model (VTM) was also released at that time.

The latest version of VVC, which is known as H.266, is embodied in the ITU-T document entitled "Versatile Video Coding," published August 2020. The reference software for VVC is known as the VVC Test Model (VTM). The VTM is embodied in the JVET document entitled "JVET-Software Manual," by Bossen, et al., published Aug. 13, 2020.

Color space and chroma subsampling are discussed.

Color space, also known as the color model (or color system), is an abstract mathematical model which simply describes the range of colors as tuples of numbers, typically as 3 or 4 values or color components (e.g., red, blue, green (RGB), etc.). Basically speaking, color space is an elaboration of the coordinate system and sub-space.

For video compression, the most frequently used color spaces are YCbCr and RGB.

YCbCr, Y'CbCr, or Y Pb/Cb Pr/Cr, also written as YCBCR or Y'CBCR, is a family of color spaces used as a part of the color image pipeline in video and digital photography systems. Y' is the luma component and CB (a.k.a., Cb) and CR (a.k.a., Cr) are the blue-difference and red-difference chroma components. Y' (with prime) is distinguished from Y, which is luminance, meaning that light intensity is nonlinearly encoded based on gamma corrected RGB primaries.

Chroma subsampling is the practice of encoding images by implementing less resolution for chroma information than for luma information, taking advantage of the human visual system's lower acuity for color differences than for luminance.

The 4:4:4 format is discussed.

Each of the three Y'CbCr components have the same sample rate, thus there is no chroma subsampling. This scheme is sometimes used in high-end film scanners and cinematic postproduction.

The 4:4:2 format is discussed.

The two chroma components are sampled at half the sample rate of luma: the horizontal chroma resolution is halved while the vertical chroma resolution is unchanged. This reduces the bandwidth of an uncompressed video signal by one-third with little to no visual difference.

FIG. 1 shows nominal vertical and horizontal locations of 4:2:2 luma and chroma samples 100 in a picture. An example of the nominal vertical and horizontal locations of 4:2:2 color format is depicted in the VVC working draft.

The 4:2:0 format is discussed.

In 4:2:0, the horizontal sampling is doubled compared to 4:1:1, but as the Cb and Cr channels are only sampled on each alternate line in this scheme, the vertical resolution is halved. The data rate is thus the same. Cb and Cr are each subsampled at a factor of 2 both horizontally and vertically. There are three variants of 4:2:0 schemes, having different horizontal and vertical siting.

In MPEG-2, Cb and Cr are co-sited horizontally. Cb and Cr are sited between pixels in the vertical direction (sited interstitially).

In Joint Photographic Experts Group (JPEG)/JPEG File Interchange Format (JFIF), H.261, and MPEG-1, Cb and Cr are sited interstitially, halfway between alternate luma samples.

In 4:2:0 DV, Cb and Cr are co-sited in the horizontal direction. In the vertical direction, they are co-sited on alternating lines.

TABLE 3-1

SubWidthC and SubHeightC values derived from chroma_format_idc and separate_colour_plane_flag

| chroma_format_idc | separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

Coding flow of a typical video codec is discussed.

Figure 2:
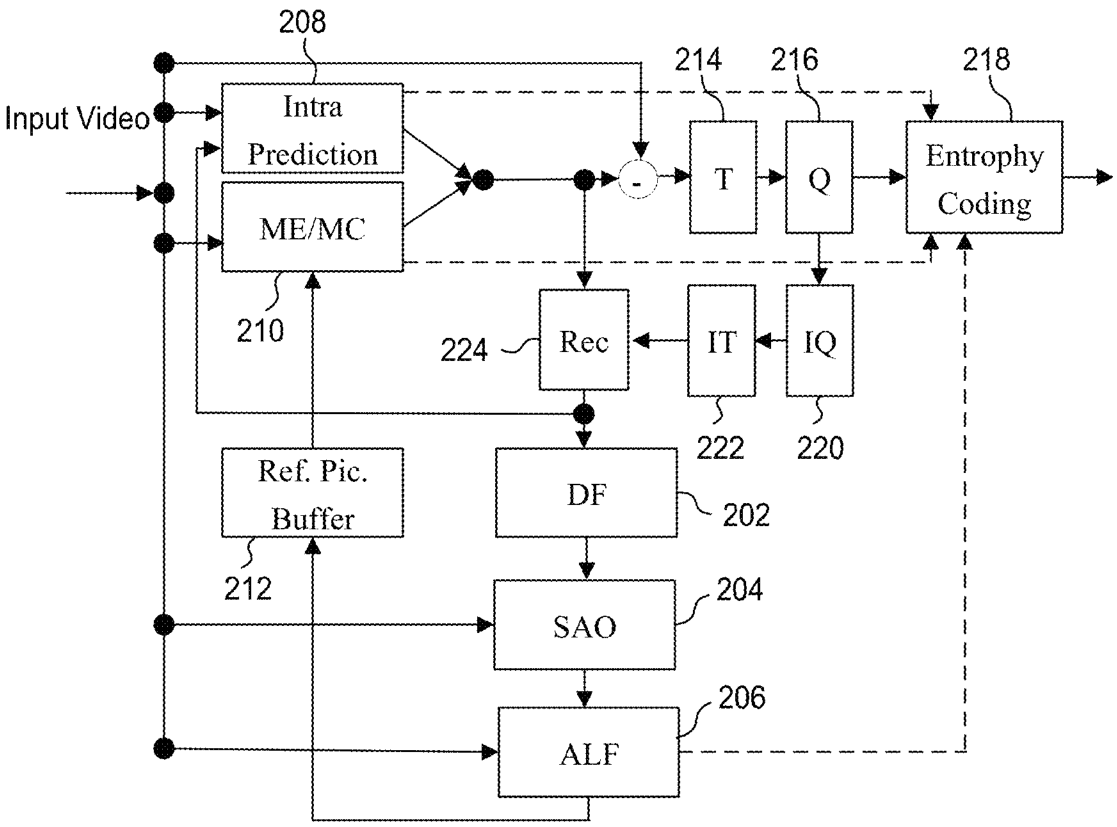
FIG. 2 is an example of encoder block diagram.

FIG. 2 is an example of encoder block diagram 200. The encoder 200 is suitable for implementing the techniques of VVC. The encoder 200 includes three in-loop filters, namely a deblocking filter (DF) 202, a sample adaptive offset (SAO) 204, and an adaptive loop filter (ALF) 206. Unlike the DF 202, which uses predefined filters, the SAO 204 and the ALF 206 utilize the original samples of the current picture to reduce the mean square errors between the original samples and the reconstructed samples by adding an offset and by applying a finite impulse response (FIR) filter, respectively, with coded side information signaling the offsets and filter coefficients. The ALF 206 is located at the last processing stage of each picture and can be regarded as a tool trying to catch and fix artifacts created by the previous stages.

The encoder 200 further includes an intra prediction component 208 and a motion estimation/compensation (ME/MC) component 210 configured to receive input video. The intra prediction component 208 is configured to perform intra prediction, while the ME/MC component 210 is configured to utilize reference pictures obtained from a reference picture buffer 212 to perform inter prediction. Residual blocks from inter prediction or intra prediction are fed into a transform component 214 and a quantization component 216 to generate quantized residual transform coefficients, which are fed into an entropy coding component 218. The entropy coding component 218 entropy codes the prediction results and the quantized transform coefficients and transmits the same toward a video decoder (not shown). Quantization components output from the quantization component 216 may be fed into an inverse quantization components 220, an inverse transform component 222, and a reconstruction (REC) component 224. The REC component 224 is able to output images to the DF 202, the SAO 204, and the ALF 206 for filtering prior to those images being stored in the reference picture buffer 212.

Pictures/Slices/Tiles are divided into a sequence of coding tree units (CTUs). The CTU concept discussed herein is the same as that of HEVC. For a picture that has three sample arrays (e.g., non-monochrome cases), a CTU consists of an N×N block of luma samples together with two corresponding blocks of chroma samples. The maximum allowed size of the luma block in a CTU is specified to be 128×128 (although the maximum size of the luma transform blocks is 64×64).

In HEVC, a CTU is split into coding units (CUs) using a quaternary-tree structure denoted as coding tree to adapt to various local characteristics. The decision whether to code a picture area using inter-picture (temporal) or intra-picture (spatial) prediction is made at the leaf CU level. Each leaf CU can be further split into one, two, or four prediction units (PUs) according to the PU splitting type. Inside one PU, the same prediction process is applied, and the relevant information is transmitted to the decoder on a PU basis. After obtaining the residual block by applying the prediction process based on the PU splitting type, a leaf CU can be partitioned into transform units (TUs) according to another quaternary-tree structure similar to the coding tree for the CU. One key feature of the HEVC structure is that the HEVC structure has the multiple partition conceptions including CU, PU, and TU.

In VVC, a quadtree with nested multi-type tree (MTT) using binary and ternary splits segmentation structure replaces the concepts of multiple partition unit types. That is, the MTT using binary and ternary splits segmentation structure removes the separation of the CU, PU, and TU concepts except for a few cases wherein CUs may be larger than PUs, e.g., when CUs have a size larger than the maximum transform length. The MTT using binary and ternary splits segmentation structure supports more flexibility for CU partition shapes. In the coding tree structure, a CU can have either a square or rectangular shape. A CTU is first partitioned by a quaternary tree (a.k.a., quadtree or quad tree) structure. Then, the quaternary tree leaf nodes can be further partitioned by a multi-type tree structure.

Intra prediction is discussed.

Figure 3:
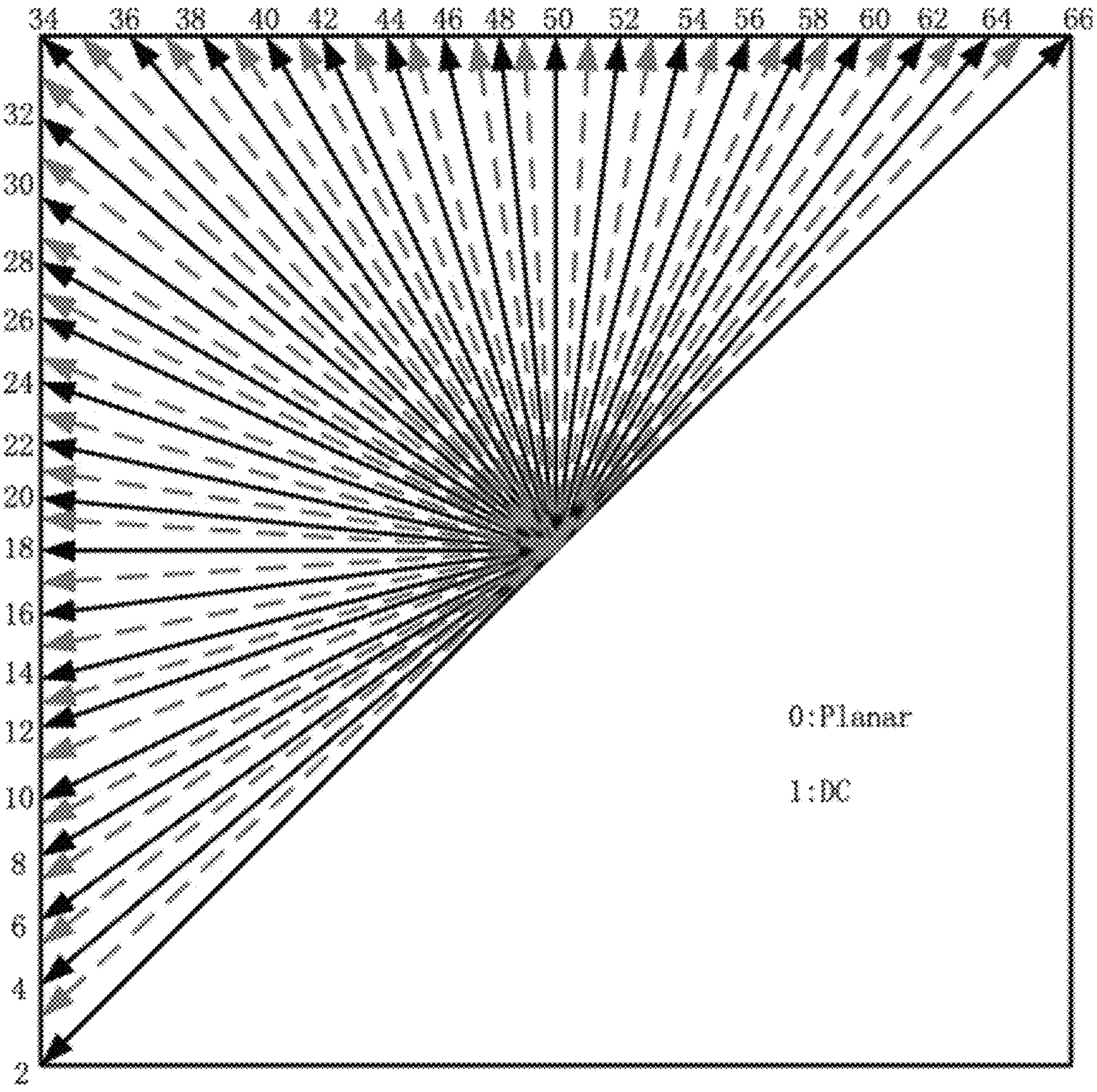
FIG. 3 is an example of 67 intra prediction modes.

FIG. 3 is an example of 67 intra prediction modes 300. To capture the arbitrary edge directions presented in natural video, the number of directional intra modes is extended from 33, as used in HEVC, to 65. The additional directional modes are depicted as dotted arrows in FIG. 3 and the planar and direct current (DC) modes remain the same. These denser directional intra prediction modes apply for all block sizes and for both luma and chroma intra predictions.

Conventional angular intra prediction directions are defined from 45 degrees to −135 degrees in clockwise direction as shown in FIG. 3. In VTM, several conventional angular intra prediction modes are adaptively replaced with wide-angle intra prediction modes for the non-square blocks. The replaced modes are signaled using the original method and remapped to the indexes of wide angular modes after parsing. The total number of intra prediction modes is unchanged, i.e., 67, and the intra mode coding is unchanged.

In the HEVC, every intra-coded block has a square shape and the length of each of its side is a power of 2. Thus, no division operations are required to generate an intra-predictor using DC mode. In VVC, blocks can have a rectangular shape that necessitates the use of a division operation per block in the general case. To avoid division operations for DC prediction, only the longer side is used to compute the average for non-square blocks.

Inter prediction is discussed.

For each inter-predicted coding unit (CU), motion parameters consisting of motion vectors, reference picture indices and reference picture list usage index, and additional information needed for the new coding feature of VVC to be used for inter-predicted sample generation. The motion parameter can be signaled in an explicit or implicit manner. When a CU is coded with skip mode, the CU is associated with one prediction unit (PU) and has no significant residual coefficients, no coded motion vector delta or reference picture index. A merge mode is specified whereby the motion parameters for the current CU are obtained from neighboring CUs, including spatial and temporal candidates, and additional schedules introduced in VVC. The merge mode can be applied to any inter-predicted CU, not only for skip mode. The alternative to merge mode is the explicit transmission of motion parameters, where motion vector, corresponding reference picture index for each reference picture list and reference picture list usage flag and other needed information are signaled explicitly per each CU.

Deblocking filter is discussed.

Deblocking filtering typical in-loop filter in video codec. In VVC, the deblocking filtering process is applied on CU boundaries, transform subblock boundaries, and prediction subblock boundaries. The prediction subblock boundaries include the prediction unit boundaries introduced by the subblock-based temporal motion vector prediction (SbTMVP) and affine modes, and the transform subblock boundaries include the transform unit boundaries introduced by subblock transform (SBT) and intra sub-partitions (ISP) modes and transforms due to implicit split of large CUs. As done in HEVC, the processing order of the deblocking filter is defined as horizontal filtering for vertical edges for the entire picture first, followed by vertical filtering for horizontal edges. This specific order enables either multiple horizontal filtering or vertical filtering processes to be applied in parallel threads or can still be implemented on a coding tree block (CTB)-by-CTB basis with only a small processing latency.

Sample adaptive offset is discussed.

Sample adaptive offset (SAO) is applied to the reconstructed signal after the deblocking filter by using offsets specified for each CTB by the encoder. The video encoder first makes the decision on whether or not the SAO process is to be applied for current slice. If SAO is applied for the slice, each CTB is classified as one of five SAO types as shown in Table 3-2. The concept of SAO is to classify pixels into categories and to reduce the distortion by adding an offset to pixels of each category. SAO operation includes edge offset (EO), which uses edge properties for pixel classification in SAO type 1 to 4, and band offset (BO), which uses pixel intensity for pixel classification in SAO type 5. Each applicable CTB has SAO parameters including sao_merge_left_flag, sao_merge_up_flag, SAO type, and four offsets. If sao_merge_left_flag is equal to 1, the current CTB will reuse the SAO type and offsets of the CTB to the left. If sao_merge_up_flag is equal to 1, the current CTB will reuse SAO type and offsets of the CTB above.

TABLE 3-2

Specification of SAO type

| SAO type | sample adaptive offset type to be used | Number of categories |
|---|---|---|
| 0 | None | 0 |
| 1 | 1-D 0-degree pattern edge offset | 4 |
| 2 | 1-D 90-degree pattern edge offset | 4 |
| 3 | 1-D 135-degree pattern edge offset | 4 |
| 4 | 1-D 45-degree pattern edge offset | 4 |
| 5 | band offset | 4 |

Adaptive loop filter is discussed.

Adaptive loop filtering for video coding is to minimize the mean square error between original samples and decoded samples by using Wiener-based adaptive filter. The ALF is located at the last processing stage for each picture and can be regarded as a tool to catch and fix artifacts from previous stages. The suitable filter coefficients are determined by the encoder and explicitly signaled to the decoder. In order to achieve better coding efficiency, especially for high resolution videos, local adaptation is used for luma signals by applying different filters to different regions or blocks in a picture. In addition to filter adaptation, filter on/off control at coding tree unit (CTU) level is also helpful for improving coding efficiency. Syntax-wise, filter coefficients are sent in a picture level header called adaptation parameter set, and filter on/off flags of CTUs are interleaved at CTU level in the slice data. This syntax design not only supports picture level optimization but also achieves a low encoding latency.

Bilateral in-loop filter.

Bilateral image filter is discussed.

Bilateral image filter is a nonlinear filter that smooths the noise while preserving edge structures. The bilateral filtering is a technique to make the filter weights decrease not only with the distance between the samples but also with increasing difference in intensity. This way, over-smoothing of edges can be ameliorated. A weight is defined as:

$$w(\Delta x, \Delta y, \Delta I) = e^{-\frac{\Delta x^2+\Delta y^2}{2\sigma_d^2}-\frac{\Delta I^2}{2\sigma_r^2}}$$

where Δx and Δy is the distance in the vertical and horizontal and ΔI is the difference in intensity between the samples.

The edge-preserving de-noising bilateral filter adopts a low-pass Gaussian filter for both the domain filter and the range filter. The domain low-pass Gaussian filter gives higher weight to pixels that are spatially close to the center pixel. The range low-pass Gaussian filter gives higher weight to pixels that are similar to the center pixel. Combining the range filter and the domain filter, a bilateral filter at an edge pixel becomes an elongated Gaussian filter that is oriented along the edge and is greatly reduced in gradient direction. This is the reason why the bilateral filter can smooth the noise while preserving edge structures.

Bilateral filter in video coding is discussed.

The bilateral filter in video coding is proposed as a coding tool for the VVC. See, for example, J. Strom, P. Wennersten, J. Enhorn, D. Liu, K. Andersson and R. Sjoberg, "Bilateral Loop Filter in Combination with SAO," in proceeding of IEEE Picture Coding Symposium (PCS), November 2019. The filter acts as a loop filter in parallel with the sample adaptive offset (SAO) filter. Both the bilateral filter and SAO act on the same input samples, each filter produces an offset, and these offsets are then added to the input sample to produce an output sample that, after clipping, goes to the next stage. The spatial filtering strength $\sigma_d$ is determined by the block size, with smaller blocks filtered more strongly, and the intensity filtering strength $\sigma_r$ is determined by the quantization parameter, with stronger filtering being used for higher QPs. Only the four closest samples are used, so the filtered sample intensity $I_F$ can be calculated as:

$$I_F = I_C + \frac{w_A\Delta I_A + w_B\Delta I_B + w_L\Delta I_L + w_R\Delta I_R}{w_C + w_A + w_B + w_L + w_R}$$

where $I_C$ denotes the intensity of the center sample, and where $\Delta I_A = I_A - I_C$ denotes the intensity difference between the center sample and the sample above. $\Delta I_B$, $\Delta I_L$ and $\Delta I_R$ denote the intensity difference between the center sample and that of the sample below, to the left, and to the right, respectively.

Unfortunately, existing designs for adaptive loop filter in video coding have problems and/or drawbacks. For example, in current ALF design, each online trained filter or pre-defined filter is utilized independently by each ALF processing unit to generate the final filtering output.

Disclosed herein are techniques that solve one or more of the aforementioned problems. For example, the present disclosure provides techniques where multiple filters are used jointly in a process referred to as a fusion mode. The fusion mode produces a final filtering result of a sample to be filtered (e.g., a sample in an adaptive loop filter (ALF) processing unit) using more than one filter. In some circumstances, ALF coefficients may be used to produce an additional filter for the fusion mode. By applying the fusion mode, the video coding process is improved relative to conventional video coding techniques.

The detailed embodiments below should be considered as examples to explain general concepts. These embodiments should not be interpreted in a narrow way. Furthermore, these embodiments can be combined in any manner.

In the following discussion, a video unit (a.k.a., video data unit) may be a sequence of pictures, a picture, a sub-picture, a slice, a coding tree unit (CTU), a block, or a region. The video unit may also refer to a sequence parameter set (SPS), picture parameter set (PPS), video parameter set (VPS), adaptation parameter set (APS), picture header, slice header, or CTU line (e.g., CTU row or CTU column). The video unit may comprise one color component or may comprise multiple color components.

The disclosed methods may be used in connection with in-loop filters or post-processing.

In the following discussion. SatShift(x, n) is defined as:

$$SatShift(x, n) = \begin{cases} (x + offset0) \gg n, & \text{if } (x \geq 0) \\ -((-x + offset1) \gg n), & \text{if } (x < 0) \end{cases}$$

Shift(x, n) is defined as Shift(x, n)=(x+offset0)>>n.

In one example, offset0 and/or offset1 are set to (1<<n)>>1 or (1<<(n−1)). In another example, offset0 and/or offset1 are set to 0.

In another example, offset0=offset1=((1<<n)>>1)−1 or ((1<<(n−1)))−1.

Clip3(min, max, x) is defined as:

$$Clip3(\text{Min}, \text{Max}, x) = \begin{cases} \text{Min, if } x < \text{Min} \\ \text{Max, if } x > \text{Max} \\ x\text{, otherwise} \end{cases}$$

Figure 4:
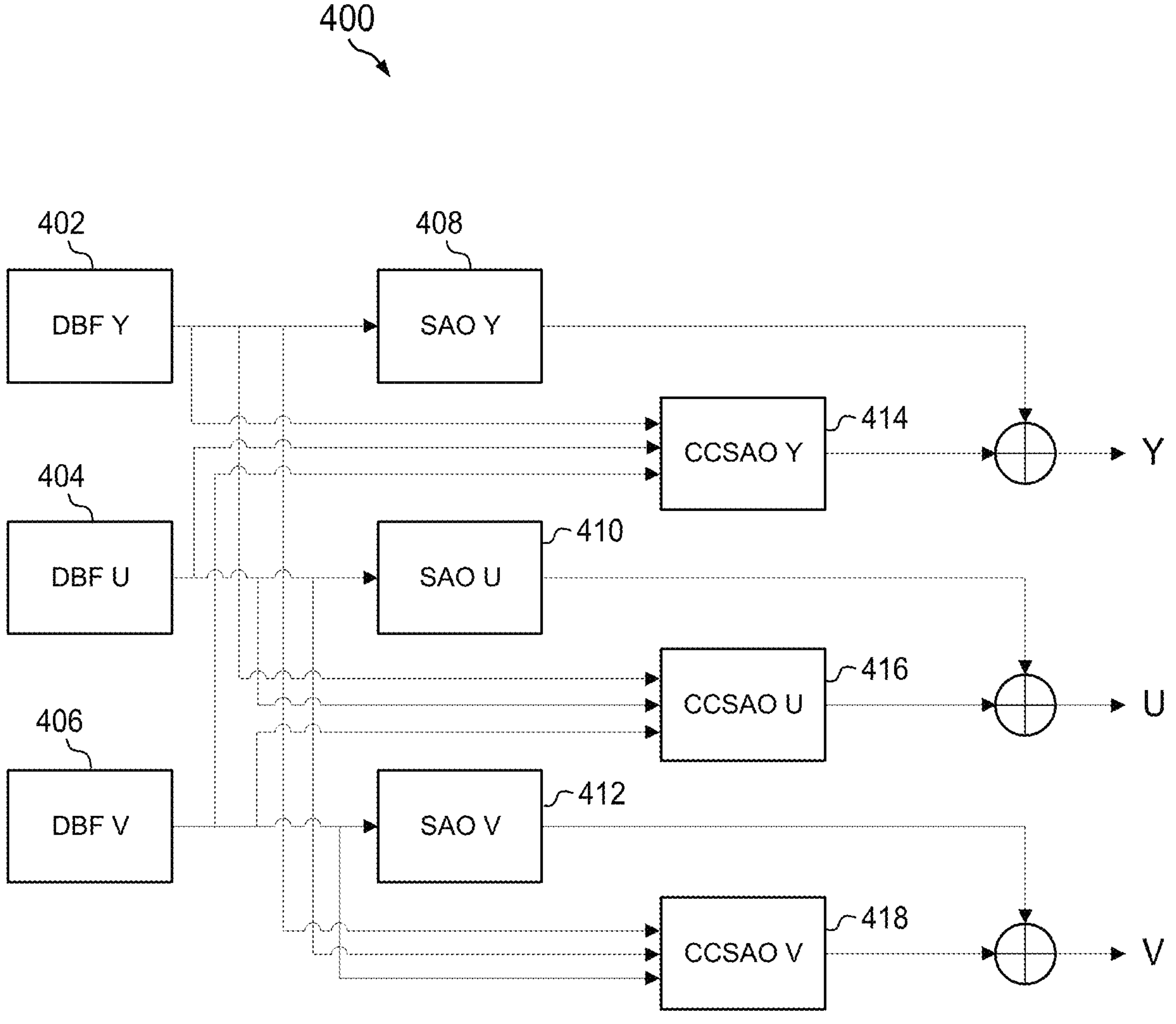
FIG. 4 is an example of a process of cross component sample adaptive offset (CCSAO).

FIG. 4 is an example of a process of CCSAO 400. CCSAO was adopted in the third generation of Audio Video Coding Standard (AVS3), which utilizes the intensities of co-located luma samples to determine the offsets of chroma sample filters. As shown, the CCSAO 400 includes a deblocking filter (DBF) for the Y component 402, a DBF for the U component 404, and a DBF for the V component 406. The CCSAO 400 also includes an SAO for the Y component 408, an SAO for the U component 410, and an SAO for the V component 412. The CCSAO 400 further includes a CCSAO for the Y component 414, a CCSAO for the U component 416, and a CCSAO for the V component 418. As shown, various outputs are combined to obtain the Y, U, and V components using the CCSAO process 400.

Figure 5:
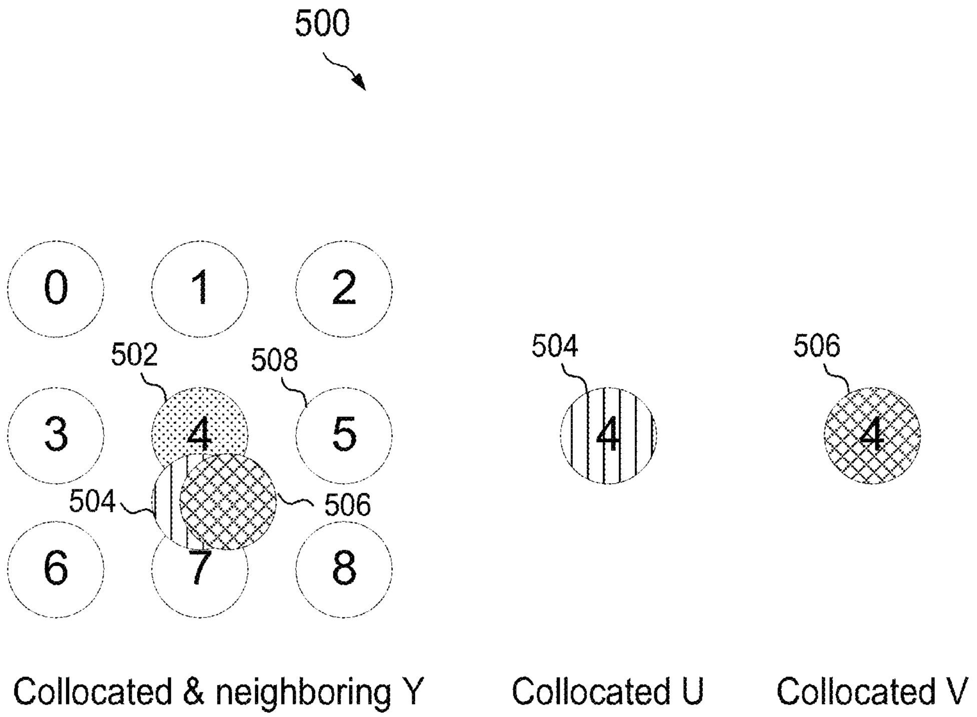
FIG. 5 is an illustration of candidate positions used for a CCSAO classifier.

FIG. 5 is an illustration of candidate positions used for a CCSAO classifier 500. For example, a co-located and neighboring luminance (brightness) component Y 502 is classified using a co-located chrominance (color) component U 504, a co-located chrominance (color) component Y 506, and/or the neighboring pixels/samples 508.

Figure 6:
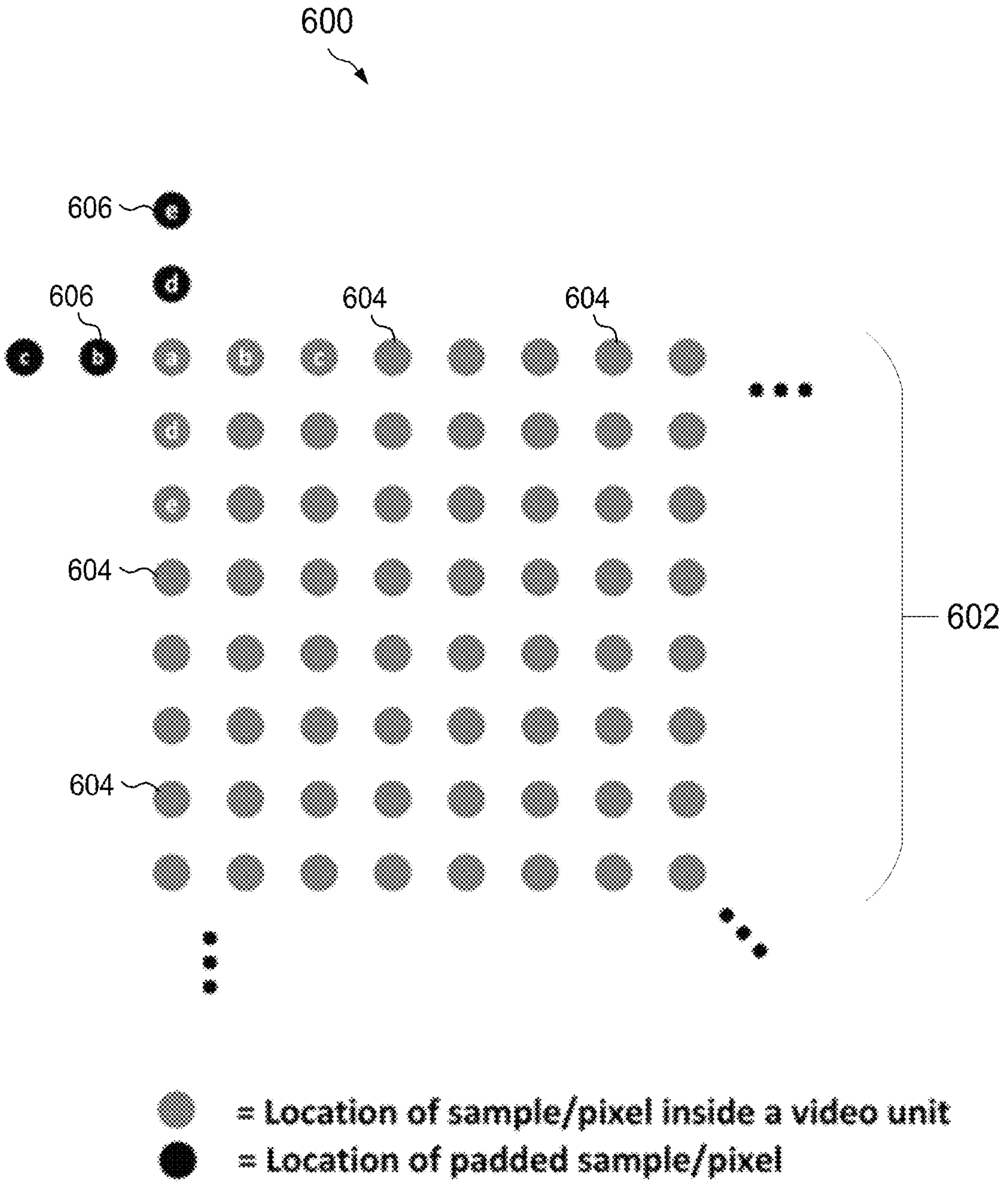
FIG. 6 is an example of mirroring padding.

FIG. 6 is an example of mirroring padding 600. As shown, a video unit 602 contains a plurality of samples/pixels 604. In mirroring padding 600, padded samples/pixels 606 are added around the video unit 602 using a mirror technique, which effectively increases the size of the video unit 602. That is, the padding is used to expand the size of the video unit 602.

Figure 7:
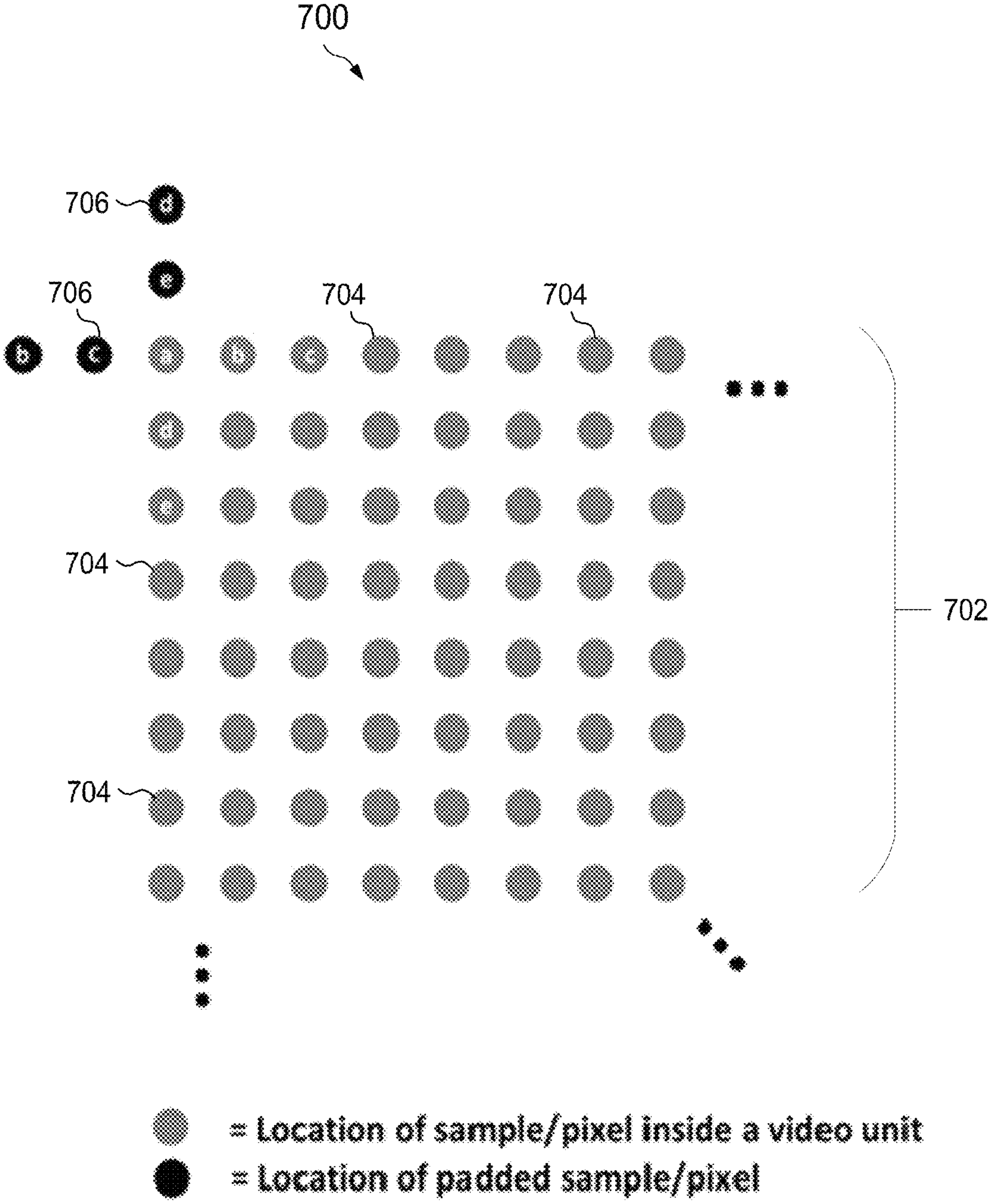
FIG. 7 is an example for extending padding.

FIG. 7 is an example for extending padding 700. As shown, a video unit 702 contains a plurality of samples/pixels 704. In extending padding 700, padded samples/pixels 706 are added around the video unit 702 using an extending technique, which effectively increases the size of the video unit 702. That is, the padding is used to expand the size of the video unit 702.

Example 1

1) In one example, the proposed/described fusion mode for filtering may be applied to any in-loop filtering, pre-processing or postprocessing filtering method in video coding (including but not limited to ALF/CCALF or any other filtering method).

a) In one example, the proposed fusion mode may be applied to an in-loop filtering method.

i. In one example, the proposed fusion mode may be applied to ALF.

ii. In one example, the proposed fusion mode may be applied to CCALF.

iii. In one example, the proposed fusion mode may be applied to other in-loop filtering methods.

b) In one example, the proposed fusion mode may be applied to a pre-processing filtering method.

c) Alternatively, the proposed fusion mode may be applied to a post-processing filtering method.

Example 2

2) The ALF processing unit within a video unit may be designed/defined into various shapes or sizes.

a) In one example, an ALF processing unit may be used as the unit for producing the classification result in ALF.

i. A class-index for current ALF processing unit may be signaled/derived/pre-defined/determined-on-the-fly.

2. In one example, an ALF processing unit may be used as a unit for producing the transpose index.

a) In one example, an ALF processing unit may use different transpose functions to the applied/selected filter/filters to generate final/intermediate filtering results.

i. In one example, the transpose function may be the mirroring function.

1. In one example, the transpose function may be the rotation function.

2. In one example, the transpose function may be the affine function.

3. In one example, the transpose function may be other transformation functions.

4. In one example, the transpose function may be combination of mirroring and rotation function.

5. Alternatively, the transpose function may be combination of several transformation functions.

6. In one example, the transpose function may be indicated by one or multiple indices, which may be signaled from encoder to decoder in a video unit.

7. A transpose index for an ALF processing unit may be signaled/derived/pre-defined/determined-on-the-fly.

c) In one example, an ALF processing unit may be used as a unit for collecting the statistical information in ALF.

i. In one example, the samples within an ALF processing unit may be used to generate the filter coefficients based on the classification/clipping results.

ii. In one example, the samples within an ALF processing unit may be used to generate the transpose index or select a transpose function.

d) In one example, an ALF processing unit may be used as a unit for selecting a specific filter within an APS/pre-defined-filter-set according to the classification results.

i. In one example, a filter-index within an APS/pre-defined-filter-set may be assigned to an ALF processing unit.

1. In one example, the filter-index within an APS/pre-defined-filter-set may be signaled/derived/pre-defined/determined-on-the-fly.

ii. In one example, the samples within an ALF processing unit may use an identical filter for filtering.

e) In one example, an ALF processing unit may have different shapes.

i. In one example, an ALF processing unit may be a square.

ii. In one example, an ALF processing unit may be a diamond.

iii. In one example, an ALF processing unit may be a rectangle.

iv. In one example, an ALF processing unit may be symmetrical.

v. Alternatively, an ALF processing unit may be asymmetrical.

vi. In one example, an ALF processing unit may be other designed shapes.

f) In one example, an ALF processing unit may have size of M×N.

i. In one example, the M may be equal to N.

ii. In one example, the M may be different from N.

iii. In one example, the M or N may be 1.

iv. Alternatively, the M and N may be 1 simultaneously.

g) In one example, a video unit may contain one/more ALF processing units.

i. In one example, a video unit may be a CU.

ii. In one example, a video unit may be a CTU.

iii. In one example, a video unit may be a CTU row.

iv. Alternatively, a video unit may be any other regions that contain more than one luma or chroma sample/pixel.

General concept of ALF fusion mode.

Example 3

3) The final filtering result of a sample to be filtered (e.g., a sample in an ALF processing unit) may be produced by more than one filters, and such a process is called ALF fusion mode.

a) One/more virtual filters are generated from signaled/derived existing filters in the ALF fusion mode.

i. Alternatively, furthermore, a virtual filter may be generated by a function of filter coefficients associated with the signaled/derived existing filters.

1. In one example, the function is a linear weighted sum.

2. In one example, the function is a non-linear function.

b. In the ALF fusion mode, multiple temporary filtering results due to multiple signaled/derived existing filters may be firstly generated, and those temporary filtering results may be utilized to generate the final filtering result.

i. Alternatively, furthermore, the final filtering result may be generated by a function of multiple temporary filtering results.

1. In one example, the function is a linear weighted sum.

2. In one example, the function is a non-linear function.

c) In the above examples, the signaled/derived existing filters may come from an identical or different ALF APSs.

d. In the above examples, the signaled/derived existing filters may come from pre-defined-filter sets.

e. In one example, all samples within one ALF processing unit may share the same fusion process.

f. In one example, all samples within one video unit (e.g., CTB/CTU) may share the same fusion process.

g. Alternatively, furthermore, the indications of the function parameters (e.g., weights) may be further signaled in the bitstream.

i. In one example, they may be signaled in PH/SH/CTU/CTB/region level.

h) Alternatively, furthermore, the indications of the function parameters (e.g., weights) may be derived on-the-fly.

General claims.

Example 4

4) In one example, the above-mentioned fusion modes/methods may be used independently for a video unit.

Example 5

5) Alternatively, the above-mentioned fusion modes/methods may be used jointly for a video unit.

Example 6

6) In one example, the above-mentioned fusion modes/methods may be used for different color components/spaces independently.

Example 7

7) Alternatively, the above-mentioned fusion modes/methods may be used for different color components/spaces jointly.

Example 8

8) In the above examples, the video unit may refer to sequence/picture/sub-picture/slice/tile/coding tree unit (CTU)/CTU row/groups of CTU/coding unit (CU)/prediction unit (PU)/transform unit (TU)/coding tree block (CTB)/coding block (CB)/prediction block (PB)/transform block (TB)/any other region that contains more than one luma or chroma sample/pixel.

Example 9

9) Whether to and/or how to apply the disclosed methods above may be signaled at sequence level/group of pictures level/picture level/slice level/tile group level, such as in sequence header/picture header/SPS/VPS/DPS/DCI/PPS/APS/slice header/tile group header.

Example 10

10) Whether to and/or how to apply the disclosed methods above may be signaled at PB/TB/CB/PU/TU/CU/VPDU/CTU/CTU row/slice/tile/sub-picture/other kinds of regions containing more than one sample or pixel.

Example 11

11) Whether to and/or how to apply the disclosed methods above may be dependent on coded information, such as block size, colour format, single/dual tree partitioning, colour component, slice/picture type.

Other techniques are discussed.

Example 12

1) In one example, the filtering result of a sample to be filtered (e.g., a sample in an ALF processing unit) may be produced by one/more virtual filters that are generated by ALF fusion mode.

a) In one example, the generated filter/filters may be produced by filters that come from an identical or different APSs/pre-defined-filter-sets.

b) In one example, all samples within one ALF processing unit may share the same fusion process.

c) In one example, one/more virtual filters may be generated by fusing the coefficients/clipping indexes of each position of multiple participated filters with a function (e.g., weighted sum).

i. In one example, a class-index for an ALF processing unit may be generated by the classification method of ALF.

ii. In on example, a transpose-index for an ALF processing unit may be generated based on the statistical information of current ALF processing unit.

iii. In one example, a specific filter may be assigned to a specific class/class-index.

1. In one example, a filter-index for an ALF processing unit may be assigned according to the class-index of current ALF processing unit.
2. In one example, the total number of filters within an APS/pre-defined-filter-set may be equal to the number of classes.
3. In one example, the total number of filters within an APS/pre-defined-filter-set may be different from the number of classes.

a) In one example, a mapping table between class-index and corresponding filter-index may be used/signaled/derived/pre-defined/determined-on-the-fly.

iv. In one example, multiple filters from APSs/pre-defined-filter-sets may be used for the proposed fusion mode for ALF coefficients/clipping indexes.

1. In one example, the participated filters may all come from APSs that contain one/more filters.

a) The participated filters may all come from an identical APS.

b) The participated filters may all come from different APSs.

c) In one example, some of the participated filters may come from an identical APS while others may come from different APSs.

2. In one example, the participated filters may all come from the pre-defined-filter-sets.
3. Alternatively, the participated filters may come from both of APS and pre-defined-filter-sets.

v. In one example, the filter length of the participated filters may be identical.

vi. Alternatively, the filter length of the participated filters may be different.

a) In one example, the filters with shorter filter length may set the missing coefficients to zero to align the filter length of all the participated filters.

vii. In one example, the filter-index based indications of the function parameters (e.g., weights) may be used for the proposed fusion mode.

1. In one example, a valid/available filter within an APS/pre-defined-filter-set may have an individual indication of the function parameters (e.g., weights).
2. In one example, when a valid/available filter within an APS/pre-defined-filter-set is assigned to an ALF processing unit, the corresponding indications of the function parameters (e.g., weights) may be used for the proposed fusion mode.
3. The indications of the function parameters (e.g., weights) may be signaled/derived/pre-defined/determined-on-the-fly.

a) The indications of the function parameters (e.g., weights) may be coded in a predictive way.

b) In one example, the fusion indications of the function parameters (e.g., weights) may be based on one/more look-up-tables.

c) In one example, the fusion indications of the function parameters (e.g., weights) may be based on the correlations.

viii. In one example, for an ALF processing unit/class-index, the indications of the function parameters (e.g., weights) for each position of the participated filters may be defined as $W_{ij}$, where $i\in[0, N-1]$ and $j\in[0, L-1]$.

1. In one example, N may denote the total number of participated filters.
2. In one example, L may denote the greatest number of filter coefficients to be derived/signaled/used/pre-defined among the participated filters.
3. In one example, the generated virtual filter may be formulated as:

$$F_{new}=[f_{new0}, f_{new1}, \ldots f_{newL-1}] f_{newj}=f_{0j}W_{0j}+f_{1j}W_{1j}+\ldots+f_{N-1j}W_{N-1j}$$

where $F_{new}$ denotes a generated virtual filter and $f_{newj}$ denotes a filter coefficient of generated virtual filter. The $f_{ij}$ denotes the filter coefficient at position j of the participated filter i.

4. In one example, each position of each participated filter may use an identical indications of the function parameters (e.g., weights) for fusing.

a. In one example, assume that the additional virtual filter is fused by M filters. The generated coefficients may be formulated as:

$$C_{A0} = W_1C_{10} + W_2C_{20} + \ldots + W_MC_{M0}$$
$$C_{A1} = W_1C_{11} + W_2C_{21} + \ldots + W_MC_{M1}$$
$$C_{Ai} = W_1C_{1i} + W_2C_{2i} + \ldots + W_MC_{Mi}$$
$$\ldots$$
$$C_{AN} = W_1C_{1N} + W_2C_{2N} + \ldots + W_MC_{MN}$$

where $W_1 \ldots W_M$ stand for the identical indications of the function parameters (e.g., weights), $C_{Ai}$ stands for the generated coefficient, N stands for the greatest number of filter coefficients to be derived/signaled/used/pre-defined among the participated filters and i stands for the coefficient position i. In one example, $W_1+\ldots+W_M=1$. In an integrate form, $C_{Ai}=\text{Shift}((W_1C_{1i}+W_2C_{2i}+\ldots+W_MC_{Mi}), S)$ . Where integers $W_1 \ldots W_M$ stand for the indications of the function parameters (e.g., weights). In one example, $W_1+\ldots+W_M=1<<S$.

5. Alternatively, each position of each participated filter may use an independent indications of the function parameters (e.g., weights) for fusing.

a) In one example, assume that additional virtual filter is fused by M filters. The produced coefficients could be formulated as:

$$C_{A0} = W_{10}C_{10} + W_{20}C_{20} + \ldots + W_{M0}C_{M0}$$
$$C_{A1} = W_{11}C_{11} + W_{21}C_{21} + \ldots + W_{M1}C_{M1}$$
$$C_{Ai} = W_{1i}C_{1i} + W_{2i}C_{2i} + \ldots + W_{Mi}C_{Mi}$$
$$\ldots$$
$$C_{AN} = W_{1N}C_{1N} + W_{2N}C_{2N} + \ldots + W_{MN}C_{MN}$$

where $W_{1i} \ldots W_{Mi}$ stand for the indications of the function parameters (e.g., weights) of different filters, N stands for the greatest number of filter coefficients to be derived/signaled/used/pre-defined among the participated filters, i stands for the position and $C_{Ai}$ stands for the generated coefficient. In one example, $W_{1i}+\ldots+W_{Mi}=1$. In an integrate form, $C_{Ai}=\text{Shift}((W_{1i}C_{1i}+W_{2i}C_{2i}+\ldots+W_{Mi}C_{Mi}),S)$. Where integers $W_{1i} \ldots W_{Mi}$ stand for the indications of the function parameters (e.g., weights). In one example, $W_{1i}+\ldots+W_{Mi}=1<<S$.

6. In one example, a fused result may be clipped. For example, $C_{Ai}=\text{Clip3}(\text{minV}, \text{maxV}, C_{Ai})$.

a) In one example, minV and/or maxV may be signaled.

7. In one example, when none of the participated filters come from an identical APS/pre-defined-filter-set, the filter that corresponds the class-index of current ALF processing unit in each APS/pre-defined-filter-set may be used for fusion.

a) In one example, the class merging may be not applied to each APS/pre-defined-filter-set, or the merging results may have difference among the selected APSs/pre-defined-filter-sets.

i. In one example, the indications of the function parameters (e.g., weights) for each position of each participated filter for every classes may be signaled/derived/pre-defined/determined-on-the-fly.

1. In one example, the indications of the function parameters (e.g., weights) may be coded in a predictive way.

2. In one example, the fusion indications of the function parameters (e.g., weights) may be based on one/more look-up-tables.

3. In one example, the fusion indications of the function parameters (e.g., weights) may be based on the correlations.

b) In one example, the class merging results may be identical among the selected APSs/pre-defined-filter-sets.

i. In one example, the indications of the function parameters (e.g., weights) for each position of each participated filter for different classes may be merged according to the class merging results of the selected APSs/pre-defined-filter-sets.

ii. Alternatively, the indications of the function parameters (e.g., weights) among the merged classes may be signaled/derived/pre-defined/determined-on-the-fly.

1. In one example, the indications of the function parameters (e.g., weights) may be coded in a predictive way.

2. In one example, the fusion indications of the function parameters (e.g., weights) may be based on one/more look-up-tables.

3. In one example, the fusion indications of the function parameters (e.g., weights) may be based on the correlations.

4. In one example, when more than one participated filter comes from an identical APS/pre-defined-filter-set, a fusion-mode-filter-index may be used to indicate which filters are selected by the fusion mode in an APS/pre-defined-filter-set.

a) In one example, one/more of the participated filters may come from different APSs/pre-defined-filter-sets.

i. In one example, the class merging may be not applied to each APS/pre-defined-filter-set, or the merging results may have difference among the selected APSs/pre-defined-filter-sets.

1. In one example, the indications of the function parameters (e.g., weights) for each position of each participated filter for every classes may be signaled/derived/pre-defined/determined-on-the-fly.

a. In one example, the indications of the function parameters (e.g., weights) may be coded in a predictive way.

b. In one example, the fusion indications of the function parameters (e.g., weights) may be based on one/more look-up-tables.

c. In one example, the fusion indications of the function parameters (e.g., weights) may be based on the correlations.

ii. In one example, the class merging results may be identical among the different selected APSs/pre-defined-filter-sets.

1. In one example, the indications of the function parameters (e.g., weights) for each position of each participated filter for different classes may be merged according to the class merging results in the selected APSs/pre-defined-filter-sets.

2. Alternatively, the indications of the function parameters (e.g., weights) among merged classes may be signaled/derived/pre-defined/determined-on-the-fly.

a) In one example, the indications of the function parameters (e.g., weights) may be coded in a predictive way.

b) In one example, the fusion indications of the function parameters (e.g., weights) may be based on one/more look-up-tables.

c) In one example, the fusion indications of the function parameters (e.g., weights) may be based on the correlations.

b) In one example, one/more of the participated filters may come from an identical APS/pre-defined-filter-set.

i. In one example, a fusion-mode-filter-index may be used to indicate which filters within an APS/pre-defined-filter-set are selected.

ii. In one example, the fusion-mode-filter-index may be signaled/derived/pre-defined/determined-on-the-fly.

iii. In one example, the fusion-mode-filter-index based indications of the function parameters (e.g., weights) may be signaled/derived/pre-defined/determined-on-the-fly.

1. In one example, the indications of the function parameters (e.g., weights) may be coded in a predictive way.

2. In one example, the fusion indications of the function parameters (e.g., weights) may be based on one/more look-up-tables.

3. In one example, the fusion indications of the function parameters (e.g., weights) may be based on the correlations.

9. In one example, the indications of the function parameters (e.g., weights) for each position among the participated filters that correspond to the class-index of current ALF processing unit may be identical.

10. In one example, the indications of the function parameters (e.g., weights) for each position among the participated filters that correspond to the class-index of current ALF processing unit may be different.

11. In one example, the indications of the function parameters (e.g., weights) for some positions may be identical while indications of the function parameters (e.g., weights) for other positions may be different among the participated filters that corresponds to the class-index of current ALF processing unit.

ix. In one example, the filters assigned to different classes may use an identical indications of the function parameters (e.g., weights) setting.

x. Alternatively, the filters assigned to different classes may use different indications of the function parameters (e.g., weights) setting.

d) In one example, the indications of the function parameters (e.g., weights) for fusing may be generated based on different type of information.

i. In one example, the indications of the function parameters (e.g., weights) may be generated based on the statistical information of current ALF processing unit/video unit/slice/picture/sequence.

ii. In one example, the indications of the function parameters (e.g., weights) may be generated based on the statistical information of the participated filters.

iii. Alternatively, the indications of the function parameters (e.g., weights) may be generated based on the encoding information of current video unit (including mode, size, number of non-zero transform coefficients or other coding information).

e. In one example, one/more additional virtual filters may be generated by multiple filters by fusing the coefficients of each position of multiple participated filters with other fusion functions.

f. In one example, one/more syntax elements may be used for the proposed ALF fusion mode.

i. In one example, filters within multiple APSs/pre-defined-filter-sets may be used by current video unit for the proposed fusion mode.

ii. In one example, a video unit level flag may be signaled/derived/pre-defined/determined-on-the-fly to indicate whether fusion mode is applied to current video unit.

iii. In one example, the number of participated filters for current video unit may be signaled/derived/pre-defined/determined-on-the-fly.

iv. In one example, a video unit level flag may be signaled/derived/pre-defined/determined-on-the-fly to indicate whether one/more APSs that contain the fused virtual filters needs to be signaled.

1. In one example, the number of APSs that contain the fused virtual filters may be signaled/derived/pre-defined/determined-on-the-fly.

v. In one example, a maximum APS/pre-defined-filter-set index may be signaled/derived/pre-defined/determined-on-the-fly.

1. In one example, for a video unit, a fixed number of APS/pre-defined-filter-set index may be always signaled/derived/pre-defined/determined-on-the-fly.

2. In one example, if one of the signaled/derived/pre-defined/determined APS/pre-defined-filter-set index is greater than the maximum APS/pre-defined-filter-set index, the corresponding APS/pre-defined-filter-set index may be not used for fusion mode.

3. In one example, if more than one of the signaled/derived/pre-defined/determined APS/pre-defined-filter-set index is greater than the maximum APS/pre-defined-filter-set index, the fusion mode may be applied for current video unit.

4. In one example, if only one/less than one of the signaled/derived/pre-defined/determined APS/pre-defined-filter-set index is less than the maximum APS/pre-defined-filter-set index, the fusion mode may be not applied for current video unit.

vi. In one example, the indications of the function parameters (e.g., weights) for each position of each participated filter may be signaled/derived/pre-defined/determined-on-the-fly.

1. In one example, the fusion indications of the function parameters (e.g., weights) may be coded in a predictive way.

2. In one example, the fusion indications of the function parameters (e.g., weights) may be based on one/more look-up-tables.

3. In one example, the fusion indications of the function parameters (e.g., weights) may be based on the correlations.

vii. In one example, the indications of the function parameters (e.g., weights) index for each position of each participated filter may be signaled/derived/pre-defined/determined-on-the-fly.

1. In one example, the indications of the function parameters (e.g., weights) indexes may be coded in a predictive way.

2. In one example, the fusion indications of the function parameters (e.g., weights) may be based on one/more look-up-tables.

3. In one example, the fusion indications of the function parameters (e.g., weights) may be based on the correlations.

viii. In one example, the indications of the function parameters (e.g., weights) of one participated filter may be set to 1 and the indications of the function parameters (e.g., weights) for other participated filters may be set to 0 by default. In such case, the proposed fusion modes/methods may be not applied.

ix. In one example, the fusion-mode-filter-index may be signaled/derived/pre-defined/determined-on-the-fly when more than one participated filter comes from an identical APS/pre-defined-filter-set.

Example 13

4) In one example, the above-mentioned fusion modes/methods may be used independently for a video unit.

Example 14

5) Alternatively, the above-mentioned fusion modes/methods may be used jointly for a video unit.

Example 15

6) In one example, the above-mentioned fusion modes/methods may be used for different color components/spaces independently.

Example 16

7) Alternatively, the above-mentioned fusion modes/methods may be used for different color components/spaces jointly.

Example 17

8) In the above examples, the video unit may refer to sequence/picture/sub-picture/slice/tile/coding tree unit (CTU)/CTU row/groups of CTU/coding unit (CU)/prediction unit (PU)/transform unit (TU)/coding tree block (CTB)/coding block (CB)/prediction block (PB)/transform block (TB)/any other region that contains more than one luma or chroma sample/pixel.

Example 18

9) Whether to and/or how to apply the disclosed methods above may be signaled at sequence level/group of pictures level/picture level/slice level/tile group level, such as in sequence header/picture header/SPS/VPS/DPS/DCI/PPS/APS/slice header/tile group header.

Example 19

10) Whether to and/or how to apply the disclosed methods above may be signaled at PB/TB/CB/PU/TU/CU/VPDU/CTU/CTU row/slice/tile/sub-picture/other kinds of regions containing more than one sample or pixel.

Example 20

Whether to and/or how to apply the disclosed methods above may be dependent on coded information, such as block size, colour format, single/dual tree partitioning, colour component, slice/picture type.

Other techniques are discussed.

Example 21

1. The ALF processing unit within a video unit may be designed/defined into various shapes or sizes.
a) In one example, an ALF processing unit may be used as the unit for producing the classification result in ALF.
i. A class-index for current ALF processing unit may be signaled/derived/pre-defined/determined-on-the-fly.
b) In one example, an ALF processing unit may be used as a unit for producing the transpose index.
i. In one example, an ALF processing unit may use different transpose functions to the applied/selected filter/filters to generate final/intermediate filtering results.
1. In one example, the transpose function may be the mirroring function.
2. In one example, the transpose function may be the rotation function.
3. In one example, the transpose function may be the affine function.
4. In one example, the transpose function may be other transformation functions.
5. In one example, the transpose function may be combination of mirroring and rotation function.
6. Alternatively, the transpose function may be combination of several transformation functions.
7. In one example, the transpose function may be indicated by one or multiple indices, which may be signaled from encoder to decoder in a video unit.
ii. A transpose index for an ALF processing unit may be signaled/derived/pre-defined/determined-on-the-fly.
c) In one example, an ALF processing unit may be used as a unit for collecting the statistical information in ALF.
i. In one example, the samples within an ALF processing unit may be used to generate the filter coefficients based on the classification/clipping results.
ii. In one example, the samples within an ALF processing unit may be used to generate the transpose index or select a transpose function.
d) In one example, an ALF processing unit may be used as a unit for selecting a specific filter within an APS/pre-defined-filter-set according to the classification results.
i. In one example, a filter-index within an APS/pre-defined-filter-set may be assigned to an ALF processing unit.
a. In one example, the filter-index within an APS/pre-defined-filter-set may be signaled/derived/pre-defined/determined-on-the-fly.
ii. In one example, the samples within an ALF processing unit may use an identical filter for filtering.
e) In one example, an ALF processing unit may have different shapes.
i. In one example, an ALF processing unit may be a square.
ii. In one example, an ALF processing unit may be a diamond.
iii. In one example, an ALF processing unit may be a rectangle.
iv. In one example, an ALF processing unit may be symmetrical.
v. Alternatively, an ALF processing unit may be asymmetrical.
vi. In one example, an ALF processing unit may be other designed shapes.
f) In one example, an ALF processing unit may have size of M×N.
i. In one example, the M may be equal to N.
ii. In one example, the M may be different from N.
iii. In one example, the M or N may be 1.
iv. Alternatively, the M and N may be 1 simultaneously.
g) In one example, a video unit may contain one/more ALF processing units.
i. In one example, a video unit may be a CU.
ii. In one example, a video unit may be a CTU.
iii. In one example, a video unit may be a CTU row.
iv. Alternatively, a video unit may be any other regions that contain more than one luma or chroma sample/pixel.

Example 22

2) In one example, the filtering result of an ALF processing unit may be generated by fusing multiple intermediate filtering results with the proposed fusion mode/method for ALF. The intermediate filtering results may be produced by filters that come from identical/different APSs/pre-defined-filter-sets.
a) The intermediate filtering results may be generated by multiple participated filters.
i. In one example, the participated filters may all come from APSs that contain one/more filters.
1. The participated filters may all come from an identical APS.
2. The participated filters may all come from different APSs.
3. Some of the participated filters may come from an identical APS while others may come from different APSs.
ii. In one example, the participated filters may all come from the pre-defined-filter-sets.
iii. Alternatively, the participated filters may come from both of APS and pre-defined-filter-sets.
b) In one example, the final filtering result of an ALF processing unit may be produced by the proposed fusion mode/method.
i. In one example, the final filtering result of an ALF processing unit may be generated by fusing one/more intermediate filtering results with a function (e.g., weighted sum function).
1. In one example, the indications of the function parameters (e.g., weights) for each intermediate filtering result may be generated based on the statistical information of an ALF processing unit/video unit.
2. Alternatively, the indications of the function parameters (e.g., weights) for each intermediate filtering result may be generated based on the gradient information of an ALF processing unit/video unit.
3. In one example, the indications of the function parameters (e.g., weights) for each intermediate filtering result may be generated based on the other information of an ALF processing unit/video unit.
4. In one example, the filter-index within an APS/pre-defined-filter-set based fusion indications of the function parameters (e.g., weights) may be used for the proposed fusion mode.

a) In one example, a valid/available filter within an APS/pre-defined-filter-set may have the individual fusion indications of the function parameters (e.g., weights).

b) The fusion indications of the function parameters (e.g., weights) may be signaled/derived/pre-defined/determined-on-the-fly.

i. The fusion indications of the function parameters (e.g., weights) may be coded in a predictive way.

ii. In one example, the fusion indications of the function parameters (e.g., weights) may be based on one/more look-up-tables.

iii. In one example, the fusion indications of the function parameters (e.g., weights) may be based on the correlations.

5. In one example, each ALF processing unit may have a class-index which corresponds to an assigned filter within an APS or a pre-defined-filter-set.

a) In one example, multiple indications of the function parameters (e.g., weights) may be used for producing the final fusion output.

1. In one example, the indications of the function parameters (e.g., weights) may be identical for all intermediate filtering results which participate in the fusion mode.

a. In one example, assume that the final filtering result is fused by N intermediate filtering results. The final filtering result of the proposed fusion mode may be formulated as:

$$F_{final}=W\times F_1+W\times F_2+\ldots+W\times F_N$$

where W stands for the fusion indications of the function parameters (e.g., weights), $F_1 \ldots F_N$ stand for the intermediate filtering results and $F_{final}$ represents the final filtering result of fusion mode.

2. In one example, the indications of the function parameters (e.g., weights) may be different for each fused intermediate filtering result which participate in the fusion mode.

a. In one example, assume that the final filtering result is fused by N intermediate filtering results. The final filtering result of the proposed fusion mode may be formulated as:

$$F_{final}=W_1\times F_1+W_2\times F_2+\ldots+W_N\times F_N$$

where $W_1 \ldots W_N$ stand for the fusion indications of the function parameters (e.g., weights), $F_1 \ldots F_N$ stand for the intermediate filtering results and $F_{final}$ represents the final filtering result of fusion mode.

a. In one example, $W_1+\ldots+W_N=1$.

b. In an integrate form, $F_{final}=\text{Shift}((W_1\times F_1+W_2\times F_2+\ldots+W_N\times F_N),S)$. Where integers $W_1 \ldots W_N$ stand for the fusion indications of the function parameters (e.g., weights), $F_1 \ldots F_N$ stand for the intermediate filtering results and $F_{final}$ represents the final filtering result of fusion mode.

c. In one example, $W_1+\ldots+W_N=1<<S$.

3. The indications of the function parameters (e.g., weights) values may depend on positions of samples.

4. The indications of the function parameters (e.g., weights) values may depend on intensities of samples.

5. In one example, a fused result may be clipped. E.g. $F_{final}=\text{Clip3}(\text{minV}, \text{maxV}, F_{final})$.

a. minV and/or maxV may be signaled.

b. minV and/or max V may depend on the bit depth.

b) In one example, none of the participated filters came from an identical APS/pre-defined-filter-set.

i. In one example, the filter assigned to the class-index of current ALF processing unit may be selected from the APS/APSs/pre-defined-filter-set.

ii. In one example, each selected filter may generate an intermediate filtering result for current ALF processing unit.

iii. In one example, the final filtering result of current ALF processing unit may be generated based on the intermediate filtering results and corresponding indications of the function parameters (e.g., weights).

iv. In one example, the class merging may be not applied on each of the selected APSs/pre-defined-filter-sets or the class merging results may have difference between the selected APSs/pre-defined-filter-sets.

a. In one example, the fusion indications of the function parameters (e.g., weights) between participated filters for each class-index of an ALF processing unit may be signaled/derive/pre-defined/determined-on-the-fly.

a) In one example, the indications of the function parameters (e.g., weights) may be coded in a predictive way.

b) In one example, the fusion indications of the function parameters (e.g., weights) may be based on one/more look-up-tables.

c) In one example, the fusion indications of the function parameters (e.g., weights) may be based on the correlations.

v. In one example, the class merging results may be identical among the selected APSs/pre-defined-filter-sets.

1. In one example, the fusion indications of the function parameters (e.g., weights) between participated filters for different classes may be merged according to the class merging results in the selected APSs/pre-defined-filter-sets.

2. Alternatively, the merged fusion indications of the function parameters (e.g., weights) between participated filters for different classes may be signaled/derived/pre-defined/determined-on-the-fly.

a) In one example, the indications of the function parameters (e.g., weights) may be coded in a predictive way.

b) In one example, the fusion indications of the function parameters (e.g., weights) may be based on one/more look-up-tables.

c) In one example, the fusion indications of the function parameters (e.g., weights) may be based on the correlations.

c) In one example, all/some of the participated filters may have come from an identical APS/pre-defined-filter-set.

i. In one example, for the participated filters that comes from different APSs/pre-defined-filter-sets, the filter assigned to the class-index of current ALF processing unit may be selected from the APS/APSs/pre-defined-filter-set.

ii. In one example, the participated filters that comes from an identical APS or pre-defined-filter-set may use a fusion-mode-filter-index to indicate which filters are selected for fusing from the APS/pre-defined-filter-set.

iii. In one example, each selected filter may generate an intermediate filtering result for current ALF processing unit.

iv. In one example, the final filtering result of current ALF processing unit may be generated based on the intermediate filtering results and corresponding indications of the function parameters (e.g., weights).

v. In one example, the class-index based fusion indications of the function parameters (e.g., weights) may be signaled/derived/pre-defined/determined-on-the-fly.

1. In one example, the indications of the function parameters (e.g., weights) may be coded in a predictive way.
2. In one example, the fusion indications of the function parameters (e.g., weights) may be based on one/more look-up-tables.
3. In one example, the fusion indications of the function parameters (e.g., weights) may be based on the correlations.

vi. Alternatively, the fusion-mode-filter-index based fusion indications of the function parameters (e.g., weights) may be signaled/derived/pre-defined/determined-on-the-fly.

1. In one example, the indications of the function parameters (e.g., weights) may be coded in a predictive way.
2. In one example, the fusion indications of the function parameters (e.g., weights) may be based on one/more look-up-tables.
3. In one example, the fusion indications of the function parameters (e.g., weights) may be based on the correlations.

ii. Alternatively, the final filtering result of an ALF processing unit may be generated by several intermediate filtering results with other fusing functions.

c) In one example, one/more syntax elements may be used for the proposed fusion mode for ALF.

i. In one example, a video unit level flag may be used for indicating whether the proposed fusion mode is applied for current video unit.

1. The video unit level flag may be signaled/derived/pre-defined/determined-on-the-fly.

ii. In one example, the number of total participated filters may be signaled/derived/pre-defined/determined-on-the-fly.

iii. In one example, the APS/pre-defined-filter-set index may be signaled/derived/pre-defined/determined-on-the-fly.

iv. In one example, a maximum APS/pre-defined-filter-set index may be signaled/derived/pre-defined/determined-on-the-fly.

1. In one example, a fixed number of APS/pre-defined-filter-set indexes may be always signaled/derived/pre-defined/determined-on-the-fly.
2. In one example, if one of the signaled/derived/pre-defined/determined APS/pre-defined-filter-set index is greater than the maximum APS/pre-defined-filter-set index, the corresponding APS/pre-defined-filter-set index may be not used for fusion mode.
3. In one example, if more than one of the signaled/derived/pre-defined/determined APS/pre-defined-filter-set index is greater than the maximum APS/pre-defined-filter-set index, the fusion mode may be applied for current video unit.
4. In one example, if only one of the signaled/derived/pre-defined/determined APS/pre-defined-filter-set index is less than the maximum APS/pre-defined-filter-set index, the fusion mode may be not applied for current video unit.

v. In one example, the fusion-mode-filter-index may be signaled/derived/pre-defined/determined-on-the-fly when more than one participated filter comes from an identical APS/pre-defined-filter-set.

vi. In one example, the indications of the function parameters (e.g., weights) for each participated filter may be signaled/derived/pre-defined/determined-on-the-fly.

1. In one example, the fusion indications of the function parameters (e.g., weights) may be coded in a predictive way.
2. In one example, the fusion indications of the function parameters (e.g., weights) may be based on one/more look-up-tables.
3. In one example, the fusion indications of the function parameters (e.g., weights) may be based on the correlations vii. In one example, the indications of the function parameters (e.g., weights) of one participated filter may be set to 1 and the indications of the function parameters (e.g., weights) for other participated filters may be set to 0 by default. In such case, the proposed fusion modes/methods may be not applied.

Figure 8:
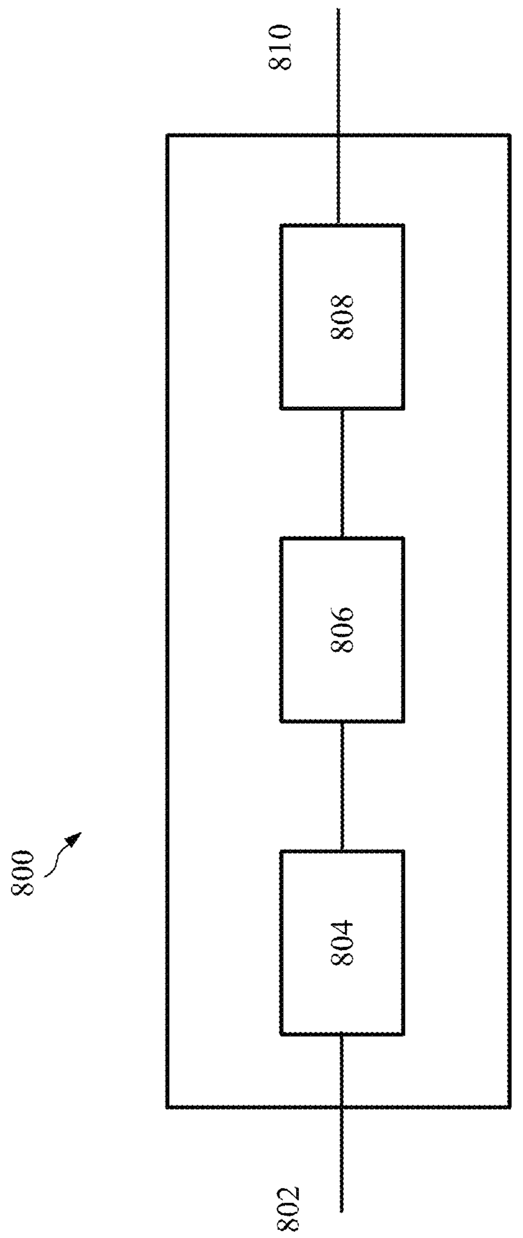
FIG. 8 is a block diagram showing an example video processing system.

FIG. 8 is a block diagram showing an example video processing system 800 in which various techniques disclosed herein may be implemented. Various implementations may include some or all of the components of the video processing system 800. The video processing system 800 may include input 802 for receiving video content. The video content may be received in a raw or uncompressed format, e.g., 8 or 10 bit multi-component pixel values, or may be in a compressed or encoded format. The input 802 may represent a network interface, a peripheral bus interface, or a storage interface. Examples of network interface include wired interfaces such as Ethernet, passive optical network (PON), etc., and wireless interfaces such as wireless fidelity (Wi-Fi) or cellular interfaces.

The video processing system 800 may include a coding component 804 that may implement the various coding or encoding methods described in the present disclosure. The coding component 804 may reduce the average bitrate of video from the input 802 to the output of the coding component 804 to produce a coded representation of the video. The coding techniques are therefore sometimes called video compression or video transcoding techniques. The output of the coding component 804 may be either stored, or transmitted via a communication connected, as represented by the component 806. The stored or communicated bitstream (or coded) representation of the video received at the input 802 may be used by the component 808 for generating pixel values or displayable video that is sent to a display interface 810. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), Peripheral Component Interconnect (PCI), Integrated Drive Electronics (IDE) interface, and the like. The techniques described in the present disclosure may be embodied in various electronic devices such as mobile phones, laptops, smartphones or other devices that are capable of performing digital data processing and/or video display.

Figure 9:
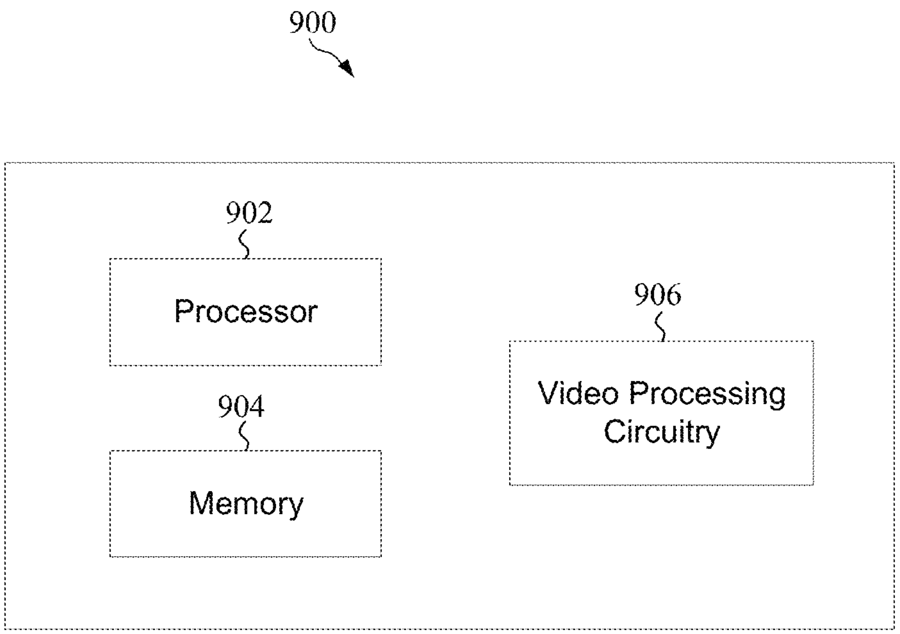
FIG. 9 is a block diagram of a video processing apparatus.

FIG. 9 is a block diagram of a video processing apparatus 900. The video processing apparatus 900 may be used to implement one or more of the methods described herein. The video processing apparatus 900 may be embodied in a smartphone, tablet, computer, Internet of Things (IoT) receiver, and so on. The video processing apparatus 900 may include one or more processors 902, one or more memories 904 and video processing hardware 906 (a.k.a., video processing circuitry). The processor(s) 902 may be configured to implement one or more methods described in the present disclosure. The memory (memories) 904 may be used for storing data and code used for implementing the methods and techniques described herein. The video processing hardware 906 may be used to implement, in hardware circuitry, some techniques described in the present disclosure. In some embodiments, the video processing hardware 906 may be partly or completely located within the processor 902, e.g., a graphics processor.

Figure 10:
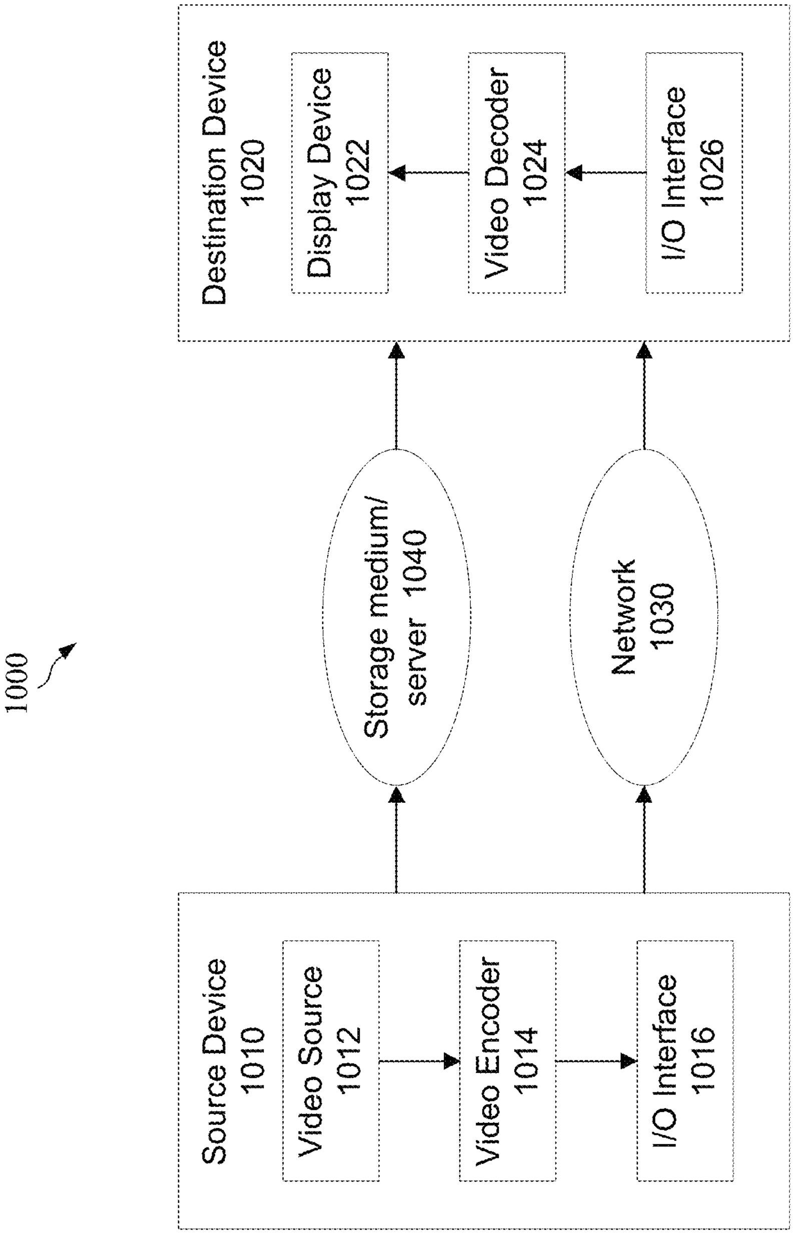
FIG. 10 is a block diagram that illustrates an example of a video coding system.

FIG. 10 is a block diagram that illustrates an example of a video coding system 1000 that may utilize the techniques of this disclosure. As shown in FIG. 10, the video coding system 1000 may include a source device 1010 and a destination device 1020. Source device 1010 generates encoded video data which may be referred to as a video encoding device. Destination device 1020 may decode the encoded video data generated by source device 1010 which may be referred to as a video decoding device.

Source device 1010 may include a video source 1012, a video encoder 1014, and an input/output (I/O) interface 1016.

Video source 1012 may include a source such as a video capture device, an interface to receive video data from a video content provider, and/or a computer graphics system for generating video data, or a combination of such sources. The video data may comprise one or more pictures. Video encoder 1014 encodes the video data from video source 1012 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 1016 may include a modulator/demodulator (modem) and/or a transmitter. The encoded video data may be transmitted directly to destination device 1020 via I/O interface 1016 through network 1030. The encoded video data may also be stored onto a storage medium/server 1040 for access by destination device 1020.

Destination device 1020 may include an I/O interface 1026, a video decoder 1024, and a display device 1022.

I/O interface 1026 may include a receiver and/or a modem. I/O interface 1026 may acquire encoded video data from the source device 1010 or the storage medium/server 1040. Video decoder 1024 may decode the encoded video data. Display device 1022 may display the decoded video data to a user. Display device 1022 may be integrated with the destination device 1020, or may be external to destination device 1020 which may be configured to interface with an external display device.

Video encoder 1014 and video decoder 1024 may operate according to a video compression standard, such as the High Efficiency Video Coding (HEVC) standard, Versatile Video Coding (VVC) standard, and other current and/or further standards.

Figure 11:
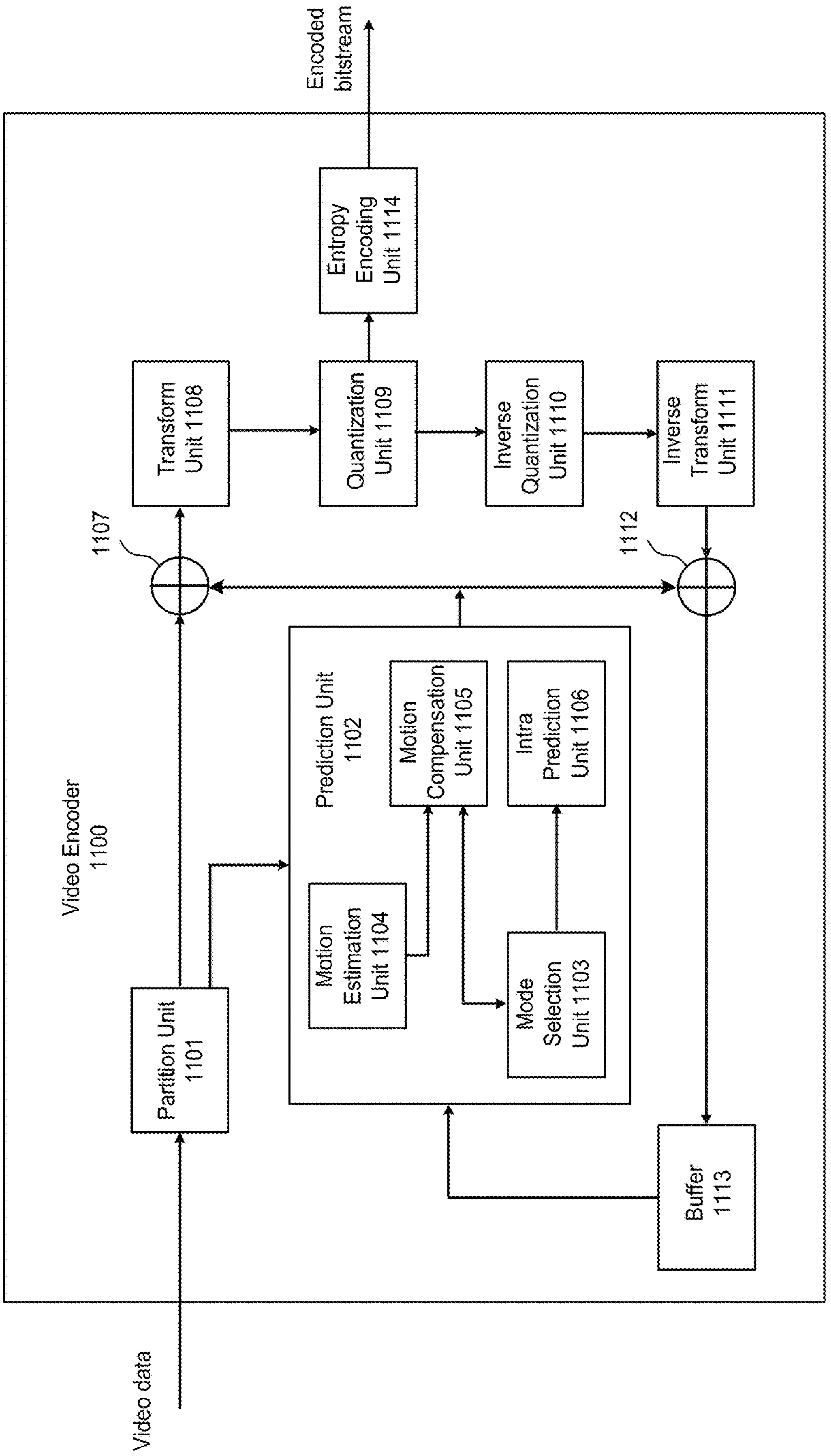
FIG. 11 is a block diagram illustrating an example of a video encoder.

FIG. 11 is a block diagram illustrating an example of a video encoder 1100, which may be video encoder 1014 in the video coding system 1000 illustrated in FIG. 10.

Video encoder 1100 may be configured to perform any or all of the techniques of this disclosure. In the example of FIG. 11, video encoder 1100 includes a plurality of functional components. The techniques described in this disclosure may be shared among the various components of video encoder 1100. In some examples, a processor may be configured to perform any or all of the techniques described in this disclosure.

The functional components of video encoder 1100 may include a partition unit 1101, a prediction unit 1102 which may include a mode selection unit 1103, a motion estimation unit 1104, a motion compensation unit 1105 and an intra prediction unit 1106, a residual generation unit 1107, a transform unit 1108, a quantization unit 1109, an inverse quantization unit 1110, an inverse transform unit 1111, a reconstruction unit 1112, a buffer 1113, and an entropy encoding unit 1114.

In other examples, video encoder 1100 may include more, fewer, or different functional components. In an example, prediction unit 1102 may include an intra block copy (IBC) unit. The IBC unit may perform prediction in an IBC mode in which at least one reference picture is a picture where the current video block is located.

Furthermore, some components, such as motion estimation unit 1104 and motion compensation unit 1105 may be highly integrated, but are represented in the example of FIG. 11 separately for purposes of explanation.

Partition unit 1101 may partition a picture into one or more video blocks. Video encoder 1014 and video decoder 1024 of FIG. 10 may support various video block sizes.

Mode selection unit 1103 may select one of the coding modes, intra or inter, e.g., based on error results, and provide the resulting intra- or inter-coded block to a residual generation unit 1107 to generate residual block data and to a reconstruction unit 1112 to reconstruct the encoded block for use as a reference picture. In some examples, mode selection unit 1103 may select a combination of intra and inter prediction (CIIP) mode in which the prediction is based on an inter prediction signal and an intra prediction signal. Mode selection unit 1103 may also select a resolution for a motion vector (e.g., a sub-pixel or integer pixel precision) for the block in the case of inter-prediction.

To perform inter prediction on a current video block, motion estimation unit 1104 may generate motion information for the current video block by comparing one or more reference frames from buffer 1113 to the current video block. Motion compensation unit 1105 may determine a predicted video block for the current video block based on the motion information and decoded samples of pictures from buffer 1113 other than the picture associated with the current video block.

Motion estimation unit 1104 and motion compensation unit 1105 may perform different operations for a current video block, for example, depending on whether the current video block is an I slice, a P slice, or a B slice. I-slices (or I-frames) are the least compressible but don't require other video frames to decode. P-slices (or P-frames) can use data from previous frames to decompress and are more compressible than I-frames. B-slices (or B-frames) can use both previous and forward frames for data reference to get the highest amount of data compression.

In some examples, motion estimation unit 1104 may perform uni-directional prediction for the current video block, and motion estimation unit 1104 may search reference pictures of list 0 or list 1 for a reference video block for the current video block. Motion estimation unit 1104 may then generate a reference index that indicates the reference picture in list 0 or list 1 that contains the reference video block and a motion vector that indicates a spatial displacement between the current video block and the reference video block. Motion estimation unit 1104 may output the reference index, a prediction direction indicator, and the motion vector as the motion information of the current video block. Motion compensation unit 1105 may generate the predicted video block of the current block based on the reference video block indicated by the motion information of the current video block.

In other examples, motion estimation unit 1104 may perform bi-directional prediction for the current video block, motion estimation unit 1104 may search the reference pictures in list 0 for a reference video block for the current video block and may also search the reference pictures in list 1 for another reference video block for the current video block. Motion estimation unit 1104 may then generate reference indexes that indicate the reference pictures in list 0 and list 1 containing the reference video blocks and motion vectors that indicate spatial displacements between the reference video blocks and the current video block. Motion estimation unit 1104 may output the reference indexes and the motion vectors of the current video block as the motion information of the current video block. Motion compensation unit 1105 may generate the predicted video block of the current video block based on the reference video blocks indicated by the motion information of the current video block.

In some examples, motion estimation unit 1104 may output a full set of motion information for decoding processing of a decoder.

In some examples, motion estimation unit 1104 may not output a full set of motion information for the current video. Rather, motion estimation unit 1104 may signal the motion information of the current video block with reference to the motion information of another video block. For example, motion estimation unit 1104 may determine that the motion information of the current video block is sufficiently similar to the motion information of a neighboring video block.

In one example, motion estimation unit 1104 may indicate, in a syntax structure associated with the current video block, a value that indicates to the video decoder 1024 that the current video block has the same motion information as another video block.

In another example, motion estimation unit 1104 may identify, in a syntax structure associated with the current video block, another video block and a motion vector difference (MVD). The motion vector difference indicates a difference between the motion vector of the current video block and the motion vector of the indicated video block. The video decoder 1024 may use the motion vector of the indicated video block and the motion vector difference to determine the motion vector of the current video block.

As discussed above, video encoder 1014 may predictively signal the motion vector. Two examples of predictive signaling techniques that may be implemented by video encoder 1014 include advanced motion vector prediction (AMVP) and merge mode signaling.

Intra prediction unit 1106 may perform intra prediction on the current video block. When intra prediction unit 1106 performs intra prediction on the current video block, intra prediction unit 1106 may generate prediction data for the current video block based on decoded samples of other video blocks in the same picture. The prediction data for the current video block may include a predicted video block and various syntax elements.

Residual generation unit 1107 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block, for example in a skip mode, and residual generation unit 1107 may not perform the subtracting operation.

Transform unit 1108 may generate one or more transform coefficient video blocks for the current video block by applying one or more transforms to a residual video block associated with the current video block.

After transform unit 1108 generates a transform coefficient video block associated with the current video block, quantization unit 1109 may quantize the transform coefficient video block associated with the current video block based on one or more quantization parameter (QP) values associated with the current video block.

Inverse quantization unit 1110 and inverse transform unit 1111 may apply inverse quantization and inverse transforms to the transform coefficient video block, respectively, to reconstruct a residual video block from the transform coefficient video block. Reconstruction unit 1112 may add the reconstructed residual video block to corresponding samples from one or more predicted video blocks generated by the prediction unit 1102 to produce a reconstructed video block associated with the current block for storage in the buffer 1113.

After reconstruction unit 1112 reconstructs the video block, loop filtering operation may be performed to reduce video blocking artifacts in the video block.

Entropy encoding unit 1114 may receive data from other functional components of the video encoder 1100. When entropy encoding unit 1114 receives the data, entropy encoding unit 1114 may perform one or more entropy encoding operations to generate entropy encoded data and output a bitstream that includes the entropy encoded data.

Figure 12:
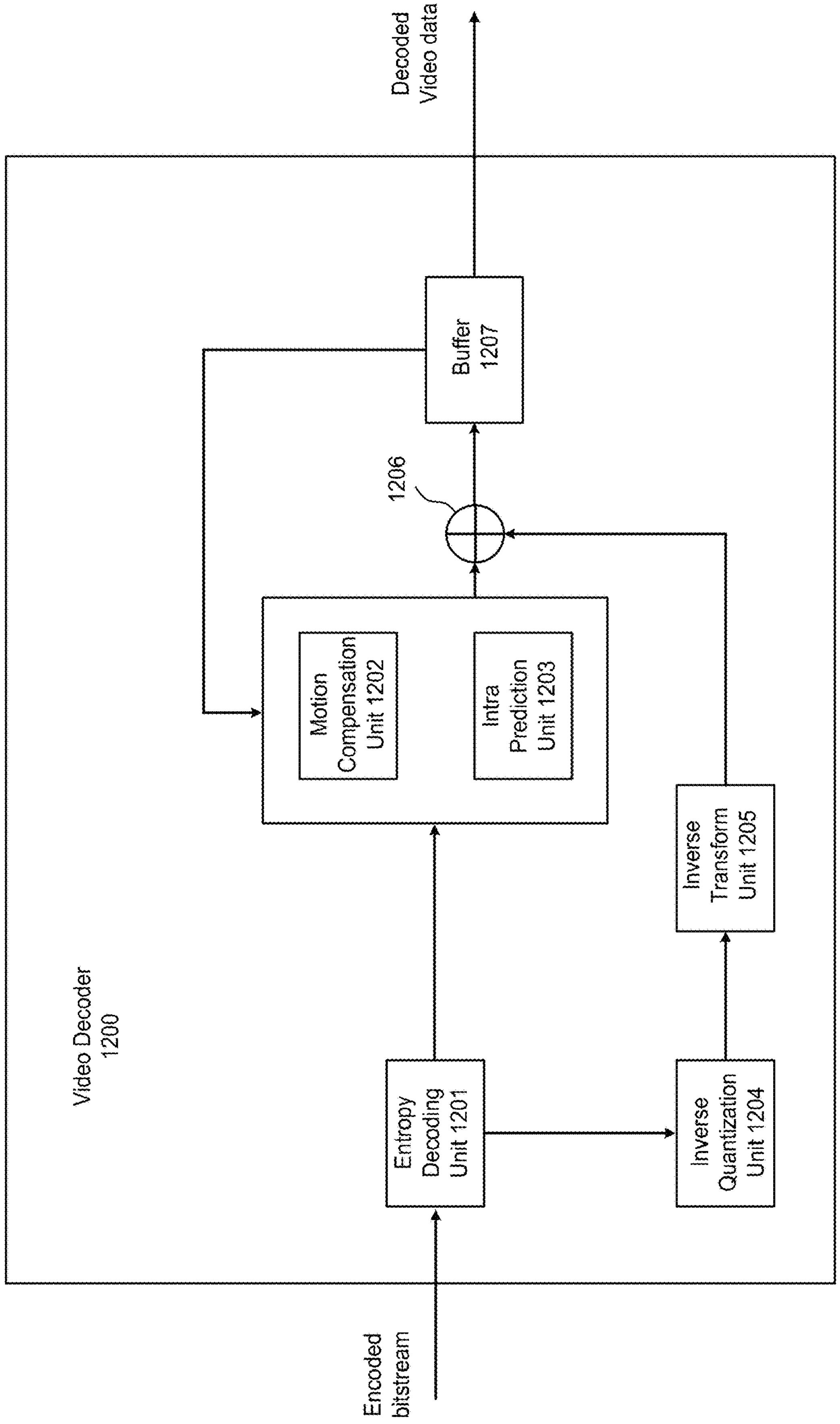
FIG. 12 is a block diagram illustrating an example of a video decoder.

FIG. 12 is a block diagram illustrating an example of a video decoder 1200, which may be video decoder 1024 in the video coding system 1000 illustrated in FIG. 10.

The video decoder 1200 may be configured to perform any or all of the techniques of this disclosure. In the example of FIG. 12, the video decoder 1200 includes a plurality of functional components. The techniques described in this disclosure may be shared among the various components of the video decoder 1200. In some examples, a processor may be configured to perform any or all of the techniques described in this disclosure.

In the example of FIG. 12, video decoder 1200 includes an entropy decoding unit 1201, a motion compensation unit 1202, an intra prediction unit 1203, an inverse quantization unit 1204, an inverse transformation unit 1205, a reconstruction unit 1206 and a buffer 1207. Video decoder 1200 may, in some examples, perform a decoding pass generally reciprocal to the encoding pass described with respect to video encoder 1014 (FIG. 10).

Entropy decoding unit 1201 may retrieve an encoded bitstream. The encoded bitstream may include entropy coded video data (e.g., encoded blocks of video data). Entropy decoding unit 1201 may decode the entropy coded video data, and from the entropy decoded video data, motion compensation unit 1202 may determine motion information including motion vectors, motion vector precision, reference picture list indexes, and other motion information. Motion compensation unit 1202 may, for example, determine such information by performing the AMVP and merge mode signaling.

Motion compensation unit 1202 may produce motion compensated blocks, possibly performing interpolation based on interpolation filters. Identifiers for interpolation filters to be used with sub-pixel precision may be included in the syntax elements.

Motion compensation unit 1202 may use interpolation filters as used by video encoder 1014 during encoding of the video block to calculate interpolated values for sub-integer pixels of a reference block. Motion compensation unit 1202 may determine the interpolation filters used by video encoder 1014 according to received syntax information and use the interpolation filters to produce predictive blocks.

Motion compensation unit 1202 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 1203 may use intra prediction modes for example received in the bitstream to form a prediction block from spatially adjacent blocks. Inverse quantization unit 1204 inverse quantizes, i.e., de-quantizes, the quantized video block coefficients provided in the bitstream and decoded by entropy decoding unit 1201. Inverse transform unit 1205 applies an inverse transform.

Reconstruction unit 1206 may sum the residual blocks with the corresponding prediction blocks generated by motion compensation unit 1202 or intra-prediction unit 1203 to form decoded blocks. If desired, a deblocking filter may also be applied to filter the decoded blocks in order to remove blockiness artifacts. The decoded video blocks are then stored in buffer 1207, which provides reference blocks for subsequent motion compensation/intra prediction and also produces decoded video for presentation on a display device.

Figure 13:
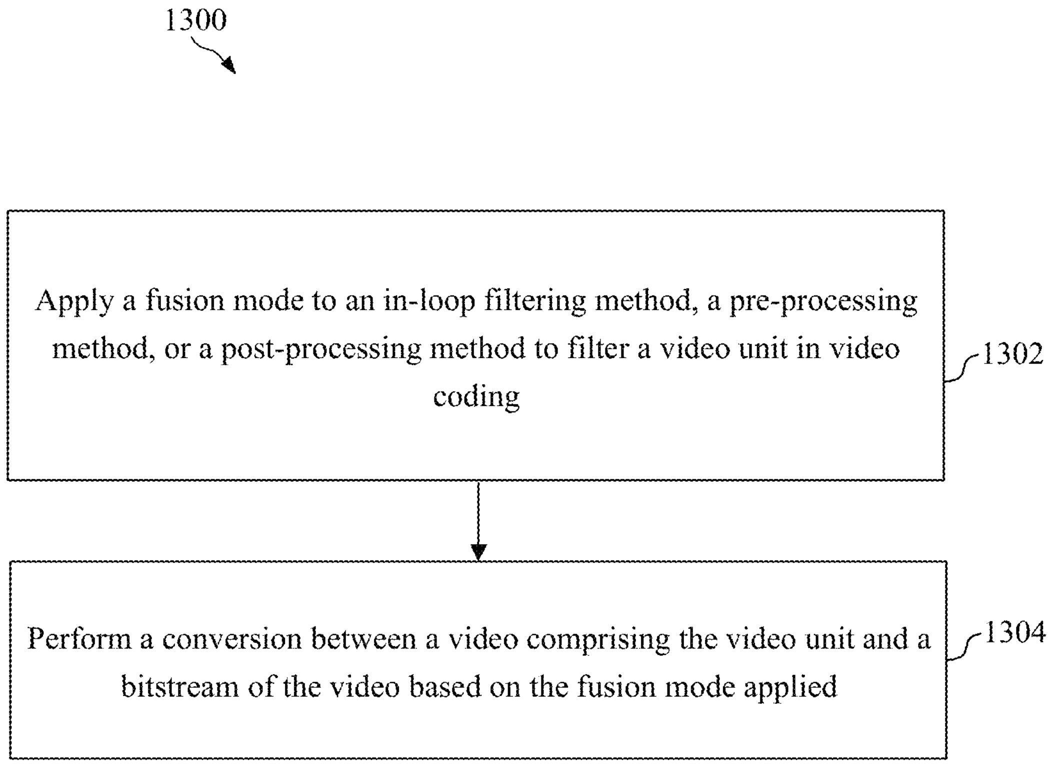
FIG. 13 is a method of processing video data according to an embodiment of the disclosure.

FIG. 13 is a method 1300 of processing video data according to an embodiment of the disclosure. The method 1300 may be performed by a coding apparatus (e.g., an encoder) having a processor and a memory. The method 1300 may be implemented when a video unit is being filtered using a fusion mode.

In block 1302, the coding apparatus applies a fusion mode to an in-loop filtering method, a pre-processing method, or a post-processing method to filter a video unit in video coding. In an embodiment, the fusion mode is a technique where multiple filters are used jointly to filter a video unit. In an embodiment, in-loop filtering is a filtering process applied after prediction and reconstruction of the coding blocks. In an embodiment, the pre-processing method comprises processing that occurs prior to the in-loop filtering. In an embodiment, the post-processing method comprises processing that occurs after the in-loop filtering.

In block 1304, the coding apparatus performs a conversion between a video comprising the video unit and a bitstream of the video based on the fusion mode applied.

In an embodiment, the fusion mode is used for the in-loop filtering method. In an embodiment, the in-loop filtering method comprises an adaptive loop filter (ALF). In an embodiment, the in-loop filtering method comprises a cross component adaptive loop filter (CCALF). In an embodiment, the in-loop filtering method comprises a sample adaptive offset (SAO) filter, a deblocking (DB) filter, or a bilateral filter (BF).

In an embodiment, the fusion mode is used for the pre-processing filtering method. In an embodiment, the fusion mode is used for the post-processing filtering method.

In an embodiment, an adaptive loop filter (ALF) processing unit within the video unit has one of plurality of different shapes or one of a plurality of different sizes. In an embodiment, an ALF processing unit comprises the portion of the video unit subject to ALF filtering. That is, in an embodiment the region of the video unit currently being filtered using, for example, an ALF filter is an ALF processing unit.

In an embodiment, the ALF processing unit is used to produce a classification result in an adaptive loop filter (ALF). In an embodiment, a class index for the ALF processing unit is included in the bitstream, derived, pre-defined, or determined in real time, and wherein the ALF processing unit comprises a current ALF processing unit.

In an embodiment, the ALF processing unit is used to produce a transpose index. In an embodiment, the ALF processing unit uses different transpose functions for filters selected by the fusion mode, and wherein the different transpose functions are used to generate intermediate filtering results or final filtering results. In an embodiment, filters selected by the fusion mode may be referred to as participated filters, participating filters, or variants thereof.

In an embodiment, one of the transpose functions comprises a mirroring function. In an embodiment, one of the transpose functions comprises a rotation function. In an embodiment, one of the transpose functions comprises an affine function. In an embodiment, one of the transpose functions comprises a transformation function. In an embodiment, one of the transpose functions comprises a combination of a mirroring function and a rotation function. In an embodiment, one of the transpose functions is a combination of a plurality of transpose functions. In an embodiment, one of the transpose functions is indicated by one or more indices, and wherein the one or more indices are included in the video unit of the bitstream. In an embodiment, one of the transpose functions is indicated by one or more indices, and wherein the one or more indices are included in the video unit of the bitstream.

In an embodiment, the ALF processing unit is used to collect statistical information in an adaptive loop filter (ALF). In an embodiment, samples within the ALF processing unit are used to generate filter coefficients based on a classification result or a clipping result. In an embodiment, samples within the ALF processing unit are used to generate a transpose index or to select a transpose function. In an embodiment, the ALF processing unit is used to select a specific filter within an adaptation parameter set (APS) or a pre-defined filter set in accordance with a classification result.

In an embodiment, a filter index within the APS or the pre-defined filter is assigned to an adaptive loop filter (ALF) processing unit. In an embodiment, the filter index is included in the bitstream, derived, pre-defined, or determined in real time. In an embodiment, samples within the ALF processing unit use an identical filter for filtering.

In an embodiment, a shape of the ALF processing unit is square. In an embodiment, a shape of the ALF processing unit is diamond. In an embodiment, a shape of the ALF processing unit is rectangle. In an embodiment, a shape of the ALF processing unit is symmetrical. In an embodiment, a shape of the ALF processing unit is asymmetrical. In an embodiment, a shape of the ALF processing unit is a designed shape.

In an embodiment, the ALF processing unit has a size of M×N, where M represents a first dimension of the ALF processing unit and N represents a second dimension of the ALF processing unit.

In an embodiment, M is equal to N. In an embodiment, M is different than N. In an embodiment, either M or N has a value of one. In an embodiment, each of M and N have a value of one simultaneously.

In an embodiment, the ALF processing unit is one of a plurality of ALF processing units.

In an embodiment, the video unit comprises a coding unit (CU).

In an embodiment, the video unit comprises a coding tree unit (CTU).

In an embodiment, the video unit comprises a coding tree unit (CTU) row.

In an embodiment, the video unit comprises a region that contains more than one luma sample or pixel or contains more than one chroma sample or pixel.

In an embodiment, a plurality of filters are configured to filter the video unit in the fusion mode to produce a final filtering result of the video unit, wherein the video unit comprises a sample in an adaptive loop filter (ALF) processing unit, and wherein the fusion mode is referred to as an ALF fusion mode.

In an embodiment, one or more virtual filters are generated based on the plurality of filters, and wherein the plurality of filters are included in the bitstream or derived based on information in the bitstream.

In an embodiment, one or more virtual filters are generated by a function of filter coefficients associated with the plurality of filters, and wherein the plurality of filters are included in the bitstream or derived based on information in the bitstream. In an embodiment, the function is a linear weighted sum. In an embodiment, the function is a non-linear function.

In an embodiment, a plurality of temporary filtering results are generated based on the plurality of filters, wherein the plurality of filters are included in the bitstream or derived based on information in the bitstream, and wherein the plurality of temporary filtering results are used to produce the final filtering result of the video unit.

In an embodiment, a plurality of temporary filtering results are generated based on the plurality of filters, and wherein the final filtering result of the video unit is generated by a function of the plurality of temporary filtering results. In an embodiment, the function is a linear weighted sum. In an embodiment, the function is a non-linear function.

In an embodiment, the plurality of filters are included in different adaptive loop filter (ALF) adaptation parameter sets (APSs) in the bitstream or derived based on information in the different ALF APSs in the bitstream.

In an embodiment, the plurality of filters are obtained from pre-defined filter sets.

In an embodiment, all samples in the ALF processing unit share a same fusion process corresponding to the fusion mode. In an embodiment, all samples in the video unit share a same fusion process corresponding to fusion mode.

In an embodiment, indications of function parameters corresponding to the fusion mode are included in the bitstream, and wherein the function parameters comprise weights used in filtering.

In an embodiment, the indications are included in a picture header (PH), a slice header, a coding tree unit (CTU), a coding tree block (CTB), or a region level.

In an embodiment, the indications are derived in real time.

In an embodiment, the fusion mode is used independently for the video unit.

In an embodiment, two or more different fusion modes are used jointly for the video unit.

In an embodiment, two or more different fusion modes are used for different color components or different color spaces independently.

In an embodiment, two or more different fusion modes are used for different color components or different color spaces jointly.

In an embodiment, the video unit comprises a sequence of pictures, a picture, a sub-picture, a slice, a tile, one or more coding tree units (CTUs), a CTU row, a coding unit (CU), a prediction unit (PU), a transform unit (TU), a coding tree block (CTB), a coding block (CB), a prediction block (PB), a transform block (TB), any region that contains more than one luma sample or pixel, or any region that contains more than one chroma sample or pixel.

In an embodiment, whether or how to apply the method is indicated in the bitstream at a sequence level, group of pictures level, picture level, slice level, tile group level or in a sequence header, picture header, sequence parameter set (SPS), video parameter set (VPS), dependency parameter set (DPS), decoder capability information (DCI), picture parameter set (PPS), adaptation parameter set (APS), slice header, or tile group header.

In an embodiment, whether or how to apply the method is indicated in a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or region that contains more than one sample or pixel.

In an embodiment, whether or how to apply the method is dependent on coded information, and wherein the coded information comprises a block size, a color format, a single or dual tree partitioning, a color component, a slice type, or a picture type.

In an embodiment, the conversion includes encoding the video data into the bitstream. In an embodiment, the conversion includes decoding the video data from the bitstream.

A listing of solutions preferred by some embodiments is provided next.

The following solutions show example embodiments of techniques discussed in the present disclosure (e.g., Example 1).

1. A method of video processing, comprising: determining, for a conversion between a video comprising a video unit comprising one or more video blocks and a bitstream of the video, whether to use a fusion mode filtering operation across boundaries of at least some of the multiple video blocks according to a rule; and performing the conversion based on the determining; wherein the fusion mode filtering operation comprises determining a final filtering result based on temporary filtering results of multiple separate filtering operations.
2. The method of solution 1, wherein the rule specifies that one or more virtual filters are generated for determining the temporary filtering results.
3. The method of solution 2, wherein the one or more virtual filters are indicated in the bitstream.
4. The method of solution 2, wherein the one or more virtual filters are derived.
5. The method of any of solutions 3-4, wherein the one or more virtual filters are indicated in or derived from multiple adaptation parameter sets.
6. The method of any of solutions 3-4, wherein the one or more virtual filters are indicated in or derived from a pre-defined filter set.

7. The method of any of solutions 1-6, wherein the video unit corresponds to a coding tree block or a coding tree unit.
8. The method of any of solutions 1-7, wherein the final filtering results is a weighted sum of the temporary filtering results.
9. The method of solution 8, wherein the rule specifies that weights used for the weighted sum are indicated in the bitstream.
10. The method of solution 8, wherein the rule specifies that weights used for the weighted sum are derived.
11. A method of video processing, comprising: determining to use, for a conversion between a video comprising a video unit and a bitstream of the video, a filtering unit within the video unit according to a rule; and performing the conversion based on the determining, wherein the filtering unit is used for filtering at least some samples of the video unit.
12. The method of solution 11, wherein the rule specifies that the filtering unit determines a classification result during the filtering.
13. The method of solution 11, wherein the rule specifies that the filtering unit is used for determined a transpose index that is used for determining a final output of the filtering.
14. The method of any of solutions 11-13, wherein the filtering includes using different transpose functions for a number of selected filters to generate a number of intermediate results that are used to generate a final result of the filtering.
15. The method of solution 14, wherein a transpose function comprises a mirroring function, a rotation function, an affine function, or a rotation function.
16. The method of any of solutions 11-15, wherein the rule specifies that the filtering unit is used for collecting statistical information for the filtering.
17. The method of any of solutions 11-16, wherein the rule specifies selecting a specific filter using the filtering unit.
18. The method of any of solutions 11-17, wherein the rule specifies a shape of the filtering unit.
19. The method of solution 18, wherein the shape corresponds to a square or a diamond or a rectangle or a symmetric shape or an asymmetric shape.
20. The method of any of solutions 1-19, wherein the video unit is a sequence, a picture, a sub-picture, a slice, a tile, a coding tree unit (CTU), a CTU row, groups of CTU, a coding unit (CU), a prediction unit (PU), a transform unit (TU), a coding tree block (CTB), a coding block (CB), a prediction block (PB), a transform block (TB), any other region that contains more than one luma or chroma sample/pixel.
21. The method of any of solutions 1-19, wherein the rule specifies a syntax element indicates use of the rule.
22. The method of solution 21, wherein the syntax element is at a sequence level, a group of pictures level, picture level, a slice level, a tile group level, in a sequence header, a picture header, a sequence parameter set, a video parameter set a decoding parameter set, a picture parameter set, a decoding capability information, an adaptation parameter set, a slice header or a tile group header.
23. The method of solutions 1-22, wherein the rule is selectively applied based on a coded information of the video.
24. The method of solution 23, wherein the coded information comprises a color format or a partitioning type or a picture type.
25. The method of any of solutions 1-24, wherein the filter is a cross-component adaptive loop filter.
26. The method of any of solutions 1-24, wherein the filter is applied as an in-loop filter.
27. The method of any of solutions 1-24, wherein the filter is applied as a post-processing filter.
28. The method of any of solutions 1-27, wherein the conversion includes generating the bitstream from the video.
29. The method of any of solutions 1-28, wherein the conversion includes generating the video from the bitstream.
30. A video decoding apparatus comprising a processor configured to implement a method recited in one or more of solutions 1 to 28.
31. A video encoding apparatus comprising a processor configured to implement a method recited in one or more of solutions 1 to 28.
32. A computer program product having computer code stored thereon, the code, when executed by a processor, causes the processor to implement a method recited in any of solutions 1 to 28.
33. A method of video processing comprising generating a bitstream according to a method recited in any one or more of solutions 1-27 and storing the bitstream on a computer readable medium.
34. A method, an apparatus or a system described in the present disclosure.

The following documents are incorporated by reference in their entirety:

[1] J. Strom, P. Wennersten, J. Enhorn, D. Liu, K. Andersson and R. Sjoberg, "Bilateral Loop Filter in Combination with SAO," in proceeding of IEEE Picture Coding Symposium (PCS), November 2019.

The disclosed and other solutions, examples, embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disk read-only memory (CD ROM) and digital versatile disc-read only memory (DVD-ROM) disks. The processor and the memory can be supplemented by, or incorporated in, special purpose logic circuitry.

While this present disclosure contains many specifics, these should not be construed as limitations on the scope of any subject matter or of what may be claimed, but rather as descriptions of features that may be specific to particular embodiments of particular techniques. Certain features that are described in this present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this present disclosure should not be understood as requiring such separation in all embodiments.

Only a few implementations and examples are described and other implementations, enhancements and variations can be made based on what is described and illustrated in this present disclosure.

While this present disclosure contains many specifics, these should not be construed as limitations on the scope of any subject matter or of what may be claimed, but rather as descriptions of features that may be specific to particular embodiments of particular techniques. Certain features that are described in this present disclosure in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this present disclosure should not be understood as requiring such separation in all embodiments.

Only a few implementations and examples are described and other implementations, enhancements and variations can be made based on what is described and illustrated in this present disclosure.

What is claimed is:

1. A method for processing video data, comprising:

applying, during a conversion between a video comprising a video unit and a bitstream of the video, a fusion mode to an in-loop filtering method, a pre-processing method, or a post-processing method to filter the video unit; and performing the conversion based on the fusion mode applied, wherein a plurality of filters are configured to filter the video unit in the fusion mode to produce a final filtering result of the video unit, wherein the video unit comprises a sample in an ALF processing unit, and wherein the fusion mode is an ALF fusion mode, wherein a virtual filter of the fusion mode is fused by M filters, and wherein coefficients are formulated as:

$$C_{A0} = W_{10}C_{10} + W_{20}C_{20} + \ldots + W_{M0}C_{M0}$$

$$C_{A1} = W_{11}C_{11} + W_{21}C_{21} + \ldots + W_{M1}C_{M1}$$

$$C_{Ai} = W_{1i}C_{1i} + W_{2i}C_{2i} + \ldots + W_{Mi}C_{Mi}$$

$$\ldots$$

$$C_{AN} = W_{1N}C_{1N} + W_{2N}C_{2N} + \ldots + W_{MN}C_{MN}$$

where $W_1 \ldots W_M$ denote identical indications of the function parameters, where $C_{Ai}$ denotes a generated coefficient, where N denotes a greatest number of the filter coefficients derived, included in the bitstream, used, or pre-defined among the filters selected by the fusion mode, where i denotes a coefficient position.

2. The method of claim 1, wherein when the ALF fusion mode is used for the in-loop filtering method, and wherein the in-loop filtering method comprises at least one of:

an adaptive loop filter (ALF) and a cross component adaptive loop filter (CCALF).

3. The method of claim 2, wherein the video unit contains one or more ALF processing units, and wherein the ALF processing unit within the video unit has one of a plurality of different shapes or one of a plurality of different sizes.

4. The method of claim 3, wherein the ALF processing unit is used to produce a classification result in the ALF, and wherein a class index for the ALF processing unit is included in the bitstream, derived, pre-defined, or determined in real time.

5. The method of claim 3, wherein the ALF processing unit is used to produce a transpose index, and wherein the ALF processing unit uses different transpose functions for filters selected by the fusion mode, and wherein the different transpose functions are used to generate intermediate filtering results or final filtering results, wherein the different transpose functions comprise one or more of: a mirroring function, a rotation function, an affine function, a transformation function, a combination of a mirroring function and a rotation function, or a combination of a plurality of transpose functions, wherein each of the different transpose functions is indicated by one or more transpose indices, and wherein the one or more transpose indices are included in the video unit of the bitstream, and wherein the transpose index for the ALF processing unit is included in the bitstream, derived, pre-defined, or determined in real time.

6. The method of claim 3, wherein the ALF processing unit is used to collect statistical information in the ALF, and wherein samples within the ALF processing unit are used to generate filter coefficients based on a classification result or a clipping result, or wherein the samples within the ALF processing unit are used to generate a transpose index or to select a transpose function.

7. The method of claim 3, wherein the ALF processing unit is used to select a specific filter within an adaptation parameter set (APS) or a pre-defined filter set in accordance with a classification result.

8. The method of claim 7, wherein a filter index within the APS or the pre-defined filter is assigned to the ALF processing unit, or wherein the filter index is included in the bitstream, derived, pre-defined, or determined in real time, or wherein samples within the ALF processing unit use an identical filter for filtering.

9. The method of claim 3, wherein the plurality of different shapes for the ALF processing unit include at least one of: a square, a diamond, or a rectangle, wherein a shape of the ALF processing unit is symmetrical, or wherein the shape of the ALF processing unit is asymmetrical, or wherein the shape of the ALF processing unit is a designed shape.

10. The method of claim 3, wherein the ALF processing unit has a size of M×N, where M represents a first dimension of the ALF processing unit and N represents a second dimension of the ALF processing unit, wherein one of the following conditions is applied:

wherein M is equal to N, wherein M is different than N, wherein either M or N has a value of one, or wherein each of M and N have a value of one simultaneously.

11. The method of claim 3, wherein the video unit is one of: a coding unit (CU), a coding tree unit (CTU), a CTU row, or a region that contains more than one luma sample or pixel or contains more than one chroma sample or pixel.

12. The method of claim 1, wherein one or more virtual filters are generated based on the plurality of filters, and wherein the plurality of filters are included in the bitstream or derived based on information in the bitstream, or wherein the one or more virtual filters are generated by a function of filter coefficients associated with the plurality of filters which are included in the bitstream or derived based on the information in the bitstream, and wherein the function is a linear weighted sum or a non-linear function.

13. The method of claim 1, wherein a plurality of temporary filtering results are generated based on the plurality of filters, wherein the plurality of filters are included in the bitstream or derived based on information in the bitstream, and wherein the plurality of temporary filtering results are used to produce the final filtering result of the video unit, or wherein the plurality of temporary filtering results are generated based on the plurality of filters, and wherein the final filtering result of the video unit is generated by a function of the plurality of temporary filtering results, wherein the function is a linear weighted sum or a non-linear function.

14. The method of claim 1, wherein the plurality of filters are included in different ALF APSs in the bitstream or derived based on information in the different ALF APSs in the bitstream or the plurality of filters are obtained from pre-defined filter sets, wherein all samples in the ALF processing unit share a same fusion process corresponding to the fusion mode or all samples in the video unit share a same fusion process corresponding to the fusion mode, and wherein indications of function parameters corresponding to the fusion mode are included in the bitstream, and wherein the function parameters comprise weights used in filtering, and wherein the indications are included in a picture header (PH), a slice header, a CTU, a coding tree block (CTB), or a region level, or wherein the indications are derived in real time.

15. The method of claim 1, wherein at least one of the following conditions is applied to the method:

wherein the fusion mode is used independently for the video unit, wherein two or more different fusion modes are used jointly for the video unit, wherein the two or more different fusion modes are used for different color components or different color spaces independently, wherein the two or more different fusion modes are used for different color components or different color spaces jointly, wherein the video unit comprises a sequence of pictures, a picture, a sub-picture, a slice, a tile, one or more CTUs, a CTU row, a coding unit (CU), a prediction unit (PU), a transform unit (TU), a CTB, a coding block (CB), a prediction block (PB), a transform block (TB), any region that contains more than one luma sample or pixel, or any region that contains more than one chroma sample or pixel, wherein whether or how to apply the method is indicated in the bitstream at a sequence level, group of pictures level, picture level, slice level, tile group level or in a sequence header, picture header, sequence parameter set (SPS), video parameter set (VPS), dependency parameter set (DPS), decoder capability information (DCI), picture parameter set (PPS), APS, slice header, or tile group header, wherein whether or how to apply the method is indicated in a PB, a TB, a CB, a PU, a TU, a CU, a virtual pipeline data unit (VPDU), a CTU, a CTU row, a slice, a tile, a sub-picture, or region that contains more than one sample or pixel, and wherein whether or how to apply the method is dependent on coded information, and wherein the coded information comprises a block size, a color format, a single or dual tree partitioning, a color component, a slice type, or a picture type.

16. The method of claim 1, wherein the conversion includes encoding the video data into the bitstream.

17. The method of claim 1, wherein the conversion includes decoding the video data from the bitstream.

18. An apparatus for processing video data, comprising:

a processor; and a non-transitory memory with instructions thereon, wherein the instructions upon execution by the processor, cause the processor to:

apply, during a conversion between a video comprising a video unit and a bitstream of the video, a fusion mode to an in-loop filtering method, a pre-processing method, or a post-processing method to filter the video unit; and perform the conversion based on the fusion mode applied, wherein a plurality of filters are configured to filter the video unit in the fusion mode to produce a final filtering result of the video unit, wherein the video unit comprises a sample in an ALF processing unit, and wherein the fusion mode is an ALF fusion mode, wherein a virtual filter of the fusion mode is fused by M filters, and wherein coefficients are formulated as:

$$C_{A0} = W_{10}C_{10} + W_{20}C_{20} + \ldots + W_{M0}C_{M0}$$

$$C_{A1} = W_{11}C_{11} + W_{21}C_{21} + \ldots + W_{M1}C_{M1}$$

$$C_{Ai} = W_{1i}C_{1i} + W_{2i}C_{2i} + \ldots + W_{Mi}C_{Mi}$$

$$\ldots$$

$$C_{AN} = W_{1N}C_{1N} + W_{2N}C_{2N} + \ldots + W_{MN}C_{MN}$$

where $W_1 \ldots W_M$ denote identical indications of the function parameters, where $C_{Ai}$ denotes a generated coefficient, where N denotes a greatest number of the filter coefficients derived, included in the bitstream, used, or pre-defined among the filters selected by the fusion mode, where i denotes a coefficient position.

19. A non-transitory computer-readable recording medium storing a bitstream of a video which is generated by a method performed by a video processing apparatus, wherein the method comprises:

applying, for a video comprising a video unit, a fusion mode to an in-loop filtering method, a pre-processing method, or a post-processing method to filter the video unit; and generating the bitstream based on the fusion mode applied, wherein a plurality of filters are configured to filter the video unit in the fusion mode to produce a final filtering result of the video unit, wherein the video unit comprises a sample in an ALF processing unit, and wherein the fusion mode is an ALF fusion mode, wherein a virtual filter of the fusion mode is fused by M filters, and wherein coefficients are formulated as:

$$C_{A0} = W_{10}C_{10} + W_{20}C_{20} + \ldots + W_{M0}C_{M0}$$

$$C_{A1} = W_{11}C_{11} + W_{21}C_{21} + \ldots + W_{M1}C_{M1}$$

$$C_{Ai} = W_{1i}C_{1i} + W_{2i}C_{2i} + \ldots + W_{Mi}C_{Mi}$$

$$\ldots$$

$$C_{AN} = W_{1N}C_{1N} + W_{2N}C_{2N} + \ldots + W_{MN}C_{MN}$$

where $W_1 \ldots W_M$ denote identical indications of the function parameters, where $C_{Ai}$ denotes a generated coefficient, where N denotes a greatest number of the filter coefficients derived, included in the bitstream, used, or pre-defined among the filters selected by the fusion mode, where i denotes a coefficient position.

* * * * *